(12) United States Patent
Silfvast et al.

(10) Patent No.: US 10,816,812 B2
(45) Date of Patent: Oct. 27, 2020

(54) DISPLAY DEVICES WITH MULTIMODAL AUDIO

(71) Applicant: Apple Inc., Cupertino, CA (US)

(72) Inventors: Robert D. Silfvast, Belmont, CA (US); James W. VanDyke, Menlo Park, CA (US); Jeremy C. Franklin, San Francisco, CA (US); Neal D. Evans, Sunnyvale, CA (US); Christopher T. Eubank, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/381,330

(22) Filed: Apr. 11, 2019

(65) Prior Publication Data

US 2020/0089008 A1    Mar. 19, 2020

Related U.S. Application Data

(60) Provisional application No. 62/730,594, filed on Sep. 13, 2018.

(51) Int. Cl.
  *G02B 27/01*     (2006.01)
  *G06T 19/00*     (2011.01)
  *H04R 1/02*      (2006.01)

(52) U.S. Cl.
  CPC ........ *G02B 27/0176* (2013.01); *G06T 19/006* (2013.01); *H04R 1/028* (2013.01); *H04R 2499/15* (2013.01)

(58) Field of Classification Search
  CPC ........ G02B 27/0176; G02B 2027/0178; G02B 27/017; H04R 1/028; H04R 2499/15;
  (Continued)

(56) References Cited

U.S. PATENT DOCUMENTS

| 5,321,416 A | 6/1994 | Bassett et al. |
| 5,715,321 A | 2/1998 | Andrea et al. |

(Continued)

FOREIGN PATENT DOCUMENTS

| CN | 1435073 A | 8/2003 |
| CN | 101185366 A | 5/2008 |

(Continued)

OTHER PUBLICATIONS

International Search Report and Written Opinion issued in co-pending International Application No. PCT/US2019/032800 dated Sep. 13, 2019 (14 pp).

*Primary Examiner* — Rodney Amadiz
(74) *Attorney, Agent, or Firm* — Young Basile Hanlon & MacFarlane, P.C.

(57) ABSTRACT

A head-mounted display system is disclosed that includes a housing; a visual system associated with the housing to facilitate image and/or video display; a wearable support connectable to the housing; and an audio component pivotably connected to the support such that the audio component is movable between a first position in which the audio component is in general alignment with the support, and a second position in which the audio component is out of general alignment with the support. Movement from the first position to the second position transitions the audio component from a first mode (i.e., an extra-aural mode) in which sound is projected through a first port in communication with a driver to a user to a second mode (i.e., an intra-aural mode) in which sound is projected through a second port in communication with the driver to the user.

23 Claims, 18 Drawing Sheets

(58) Field of Classification Search
CPC .. H04R 1/1066; H04R 1/1075; H04R 1/1041; H04R 5/0335; H04R 1/24; H04R 1/105; H04R 3/04; G06T 19/006
See application file for complete search history.

(56) References Cited

U.S. PATENT DOCUMENTS

| | | | |
|---|---|---|---|
| 6,038,330 A | 3/2000 | Meucci, Jr. | |
| 8,553,910 B1 | 10/2013 | Dong et al. | |
| 8,761,431 B1 | 6/2014 | Jackson | |
| 9,064,442 B2 | 6/2015 | Kimura | |
| 9,100,732 B1 | 8/2015 | Dong et al. | |
| 9,716,922 B1 | 7/2017 | Parker | |
| 9,832,560 B1* | 11/2017 | Bagga | H02J 7/0044 |
| 2008/0166002 A1* | 7/2008 | Amsel | H04R 1/025 381/370 |
| 2008/0219491 A1* | 9/2008 | Ahuja | H04R 1/1075 381/370 |
| 2009/0041267 A1* | 2/2009 | Lee | H03G 3/02 381/104 |
| 2009/0232340 A1 | 9/2009 | Yang | |
| 2011/0090135 A1 | 4/2011 | Tricoukes et al. | |
| 2011/0129111 A1* | 6/2011 | Santiago | H04R 5/0335 381/379 |
| 2013/0148819 A1* | 6/2013 | You | H04R 3/00 381/74 |
| 2013/0251172 A1 | 9/2013 | Mosseri | |
| 2013/0293448 A1 | 11/2013 | Jannard | |
| 2014/0314265 A1 | 10/2014 | Freund | |
| 2014/0341415 A1* | 11/2014 | Camello | H04R 1/10 381/379 |
| 2015/0097759 A1 | 4/2015 | Evans et al. | |
| 2015/0296285 A1 | 10/2015 | Proos et al. | |
| 2016/0050483 A1 | 2/2016 | Kulavik et al. | |
| 2016/0182990 A1 | 6/2016 | Yamamoto | |
| 2016/0249124 A1* | 8/2016 | Drinkwater | G06F 1/1605 |
| 2017/0195775 A1 | 7/2017 | Morris et al. | |

FOREIGN PATENT DOCUMENTS

| | | |
|---|---|---|
| CN | 104136957 A | 11/2014 |
| CN | 104540059 A | 4/2015 |
| CN | 105431764 A | 3/2016 |
| CN | 105676455 A | 6/2016 |
| CN | 106063290 A | 10/2016 |
| CN | 207115329 U | 3/2018 |
| CN | 207301496 U | 5/2018 |
| FR | 601235 A | 2/1926 |

* cited by examiner

DISPLAY DEVICES WITH MULTIMODAL AUDIO

CROSS-REFERENCE TO RELATED APPLICATIONS

This application claims priority to U.S. Provisional Application Ser. No. 62/730,594, filed Sep. 13, 2018, entitled "Display Devices with Multimodal Audio," the contents of which are incorporated herein by reference.

FIELD

The present disclosure relates generally to wearable display devices and systems. More particularly, the present disclosure relates to wearable head-mounted displays (HMDs) with audio components that are operable in a variety of selectable modes to allow for different user experiences.

BACKGROUND

Display devices, such as wearable HMDs, for example, typically include both video and audio systems and components to create a more complete user experience. Flexibility in audio operation is often desirable in that it allows for use of the system in a variety of settings or environments. For example, in the context of virtual reality (VR), a more immersive audio experience may be desirable (e.g., to block out or cancel external noise), whereas in the context of augmented reality (AR) or mixed reality (MR), external noise may be of less import. Additionally, in situations or settings where privacy is a concern, the ability to choose between an intra-aural experience and an extra-aural experience may be advantageous in that it gives the user options and greater control over system operation. The present disclosure addresses these concerns by providing a display system that allows the user to select between a variety of audio modes to customize their experience.

SUMMARY

In one aspect of the present disclosure, a head-mounted display system is described that includes a housing; a visual system associated with the housing to facilitate image and/or video display; a user-wearable support that is connectable to (e.g., fixedly or removably supported by) the housing; and an audio component that is pivotably connected to the support such that the audio component is movable between first and second positions. In the first position, the audio component is in general alignment with the support, and in the second position, the audio component is out of general alignment with the support. Movement of the audio component between the first and second positions allows the user to vary operability of the head-mounted display system between a first mode (i.e., an extra-aural mode), in which sound is projected through a first port in communication with a driver to a user, and a second mode (i.e., an intra-aural mode), in which sound is projected through a second port in communication with the driver to the user. More specifically, movement from the first position to the second position transitions the audio component from the first mode to the second mode, and movement from the second position to the first position transitions the audio component from the second mode to the first mode.

In certain embodiments, the audio component may be fixedly connected to the support via a pivot member.

In certain embodiments, the audio component may be extendable and retractable to allow for variation in an overall length of the audio component.

In certain embodiments, the audio component may include a single driver.

In certain embodiments, the first port may face a first direction and the second port may face a second direction that is generally opposite the first direction.

In certain embodiments, the audio component may include an earpiece that is positioned to receive sound through the second port. To reduce (or entirely cancel) external noise in the second mode, the earpiece may be configured for sealing engagement with the user's ear.

In certain embodiments, the first and second ports may be separated from one another along the longitudinal axis of the audio component.

In certain embodiments, the audio component may be reconfigurable between a first configuration, in which the audio component defines a first overall length, and a second configuration, in which the audio component defines a second overall length greater than the first overall length.

In certain embodiments, the support may define a receipt structure that is configured to receive the earpiece when the audio component is in the first (intra-aural) position to inhibit sound projection from the second (extra-aural) port.

In certain embodiments, the earpiece may be configured or adapted to form a seal (either partially or entirely) with the user's ear. For example, the earpiece may include (e.g., may be formed from) a deformable foam. Additionally, or alternatively, the earpiece may be adapted for reconfiguration. For example, the earpiece may be expandable and contractible, such as by inflation and deflation.

In certain embodiments, the display system may further include a controller (e.g., a processor, module, logic circuit, etc.) in communication with the audio component to regulate sound projection in the first and second positions.

In certain embodiments, the support may include a woofer that is separate from the audio component. The woofer can produce sound at a first power level in one of the first and second modes and at a second power level in the other of the first and second modes. The first power level is not equal to the second power level.

In another aspect of the present disclosure, a display system is described that is wearable by a user. The display system includes a support, and an audio component that is movable in relation to the support between first second positions. When in the first position, the audio component is configured to project sound in a first mode, and when in the second position, the audio component is configured to project sound in a second mode. In the first mode, the audio component projects sound in at least one of a first power level or frequency response. In the second mode, the audio component projects sound in at least one of a second power level or frequency response.

In certain embodiments, the support and the audio component may be configured to allow for relocation of the audio component on the support. For example, the audio component may slidably engage the support, or the audio component may be removably (e.g., magnetically) connectable to the support. Alternatively, in certain embodiments, it is envisioned that the audio component may be fixedly connected to the support.

In certain embodiments, the audio component may be pivotable in relation to the support (e.g., via a pivot member) such that the audio component extends in generally parallel relation to the support in the first position and extends at an angle to the support in the second position.

In certain embodiments, the audio component may include a telescoping section to allow for variation in a distance defined between the support and the earpiece.

In certain embodiments, the audio component may include a first port through which sound is projected in the first position and a second port through which sound is projected in the second position.

In certain embodiments, the first and second ports may be axially offset from one another along the longitudinal axis defined by the audio component.

In certain embodiments, the support may include a woofer that is separate from the audio component. The woofer can produce sound at a first woofer power level in one of the first and second modes and at a second woofer power level in the other of the first and second modes. The first woofer power level is not equal to the second woofer power level.

In another aspect of the present disclosure, a method is described for controlling audio operability in a wearable display system including an internal display panel configured to display images and/or video. The method includes moving an audio component in relation to a wearable support of the display system to transition the audio component between an extra-aural mode, in which sound is projected through a first port, and an intra-aural mode, in which sound is projected through a second port In certain embodiments, moving the audio component in relation to the support may include pivoting the audio component about a fixed pivot member to move the audio component between first and second positions. In the first position, the audio component is in general alignment with the support and the audio component operates in the extra-aural mode such that sound is projected through the first port facing in a first direction. In the second position, the audio component is out of general alignment with the support and the audio component operates in the intra-aural mode such that sound is projected through the second port facing in a second direction opposite the first direction. Moving the audio component between the first and second positions thus includes varying sound projection through the first and second ports of the audio component.

In certain embodiments, an earpiece of the audio component may be positioned to sealingly engage a user's ear when the audio component is in the second position.

In certain embodiments, moving the audio component between the first and second positions includes varying sound projection through the first and second ports of the audio component, and the first port and the second port are axially offset from one another along a longitudinal axis of the audio component.

In certain embodiments, moving the audio component between the first and second positions causes a visual system of the wearable display system to transition between a VR mode to an AR mode or an MR mode.

DETAILED DESCRIPTION

Figure 1:
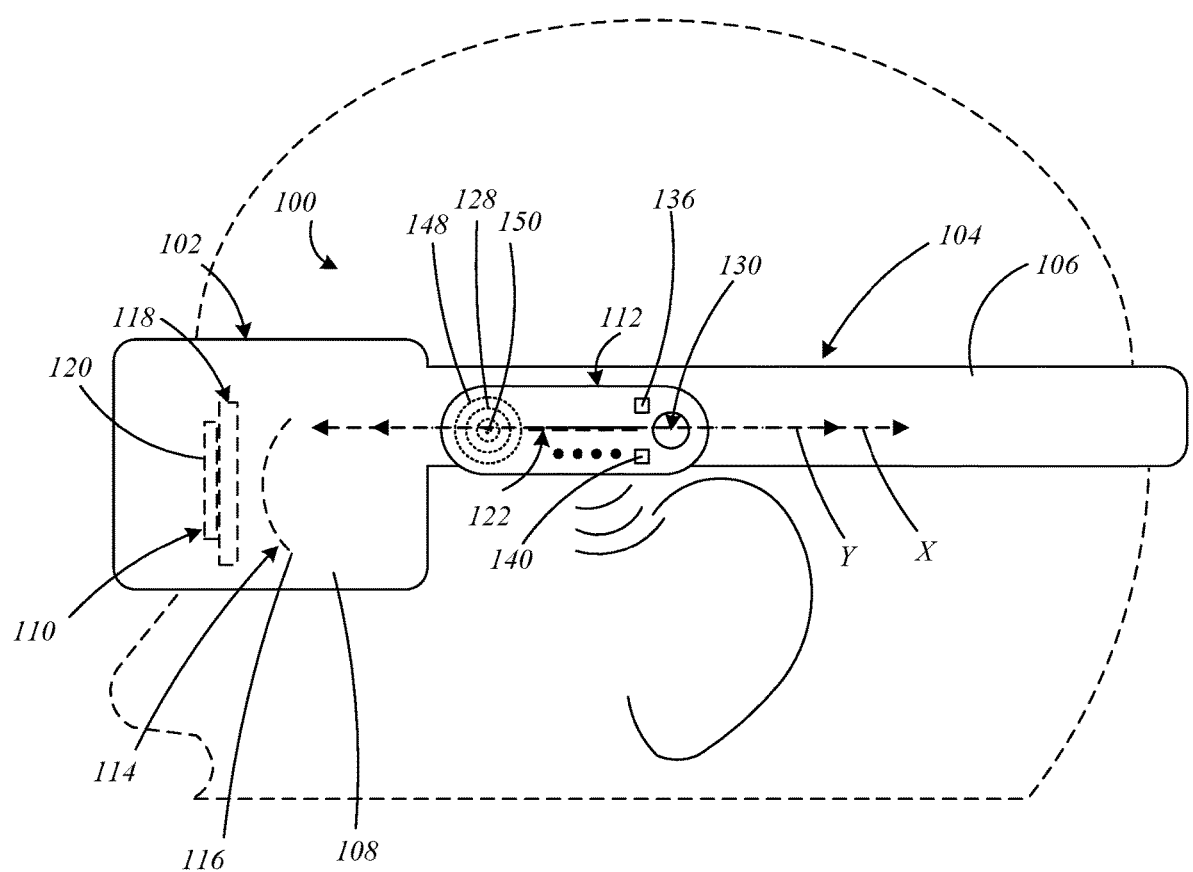
FIG. 1 is a side, plan view of a wearable display system including one embodiment of an audio component in accordance with the principles of the present disclosure shown in a first position during operation in a first mode (i.e., an extra-aural mode)

Display systems according to the present disclosure generally include a wearable support (e.g., a head strap, a headband, temples, etc.), a visual system to display images and/or video, and an audio component to add sound to the user experience. For example, the visual system may include a dock, brace, or other such support to facilitate the connection of a personal electronic device (e.g., a smartphone), or an internal display panel (e.g., an LED panel, an OLED panel, a uOLED panel, etc.). The audio component is (fixedly or releasably) connectable to (or otherwise supported by) the wearable support and is operable in a variety of modes that are selectable by the user to based upon the environment, the setting, or the desired experience. For example, the user may select between first and second modes (i.e., extra-aural and intra-aural modes) based upon a particular visual experience, whether it be virtual reality (VR), augmented reality (AR), mixed reality (MR), etc.

In the intra-aural mode, sound is projected through an earpiece and directly into the user's ear. Operation in the intra-aural mode thus allows for a more immersive audio experience, increased privacy, etc., such as, for example, in the context of VR use. To reduce (or entirely eliminate) external noise in the intra-aural mode, it is envisioned that the audio component may include noise-cancelling capabilities. For example, the earpiece, which may be adapted for either in-ear or on-ear use, may be configured to form a seal with the user's ear, either partially or entirely. To facilitate the formation of such a seal, it is envisioned that the earpiece may be deformable, expandable, etc. By contrast, in the extra-aural mode, sound is projected into an environment proximate to an ear of the user (in a direction external to a head or temple of the user) in a manner that avoids covering or otherwise obstructing the ear of the user, such as, for example, in the context of AR or MR use. The extra-aural mode thus allows delivered sound to blend with ambient sound from the environment surrounding the user, the ambient sound including the user's own voice, which can be beneficial during AR or MR use.

During operation in the intra-aural and extra-aural modes, sound is projected through a variety of distinct ports to direct sound to an intended location. It is envisioned that the audio component and/or the wearable support may include a mechanism or other such member to reduce (or eliminate) the projection of sound through one port or the other. For example, the wearable support may include a mating structure, such as a recess or a plug, that mates/fits with the earpiece to inhibit (or entirely prevent) the projection of sound through the earpiece during operation in the extra-aural mode.

The present disclosure allows for selection between the intra-aural and extra-aural modes in a variety of ways. For example, in one embodiment, the audio component can be pivoted in relation to the wearable support between first and second positions, either manually or automatically (e.g., through the use of a motor or other such suitable mechanism). Additionally, or alternatively, the user can alternate between modes by connecting and disconnecting an accessory (such as an earpiece) to the audio component, or by using a selector switch or button.

To accommodate for variation in user anatomy, in certain embodiments, the audio component may be reconfigurable or repositionable. For example, it is envisioned that the audio component may include a telescoping section that allows for variation in the overall length of the audio component, and/or that the audio component may be movable in relation to the wearable support to allow the user to position the audio component in a particular location or orientation. For example, the audio component may be slidable in relation to the wearable support, or the audio component may be removable (detachable) and relocatable. To facilitate such removal and relocation, the audio component may be configured for connection to the wearable support in a variety of locations via a mechanical interface, magnetic connection, etc.

Throughout the present disclosure, a physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 2:
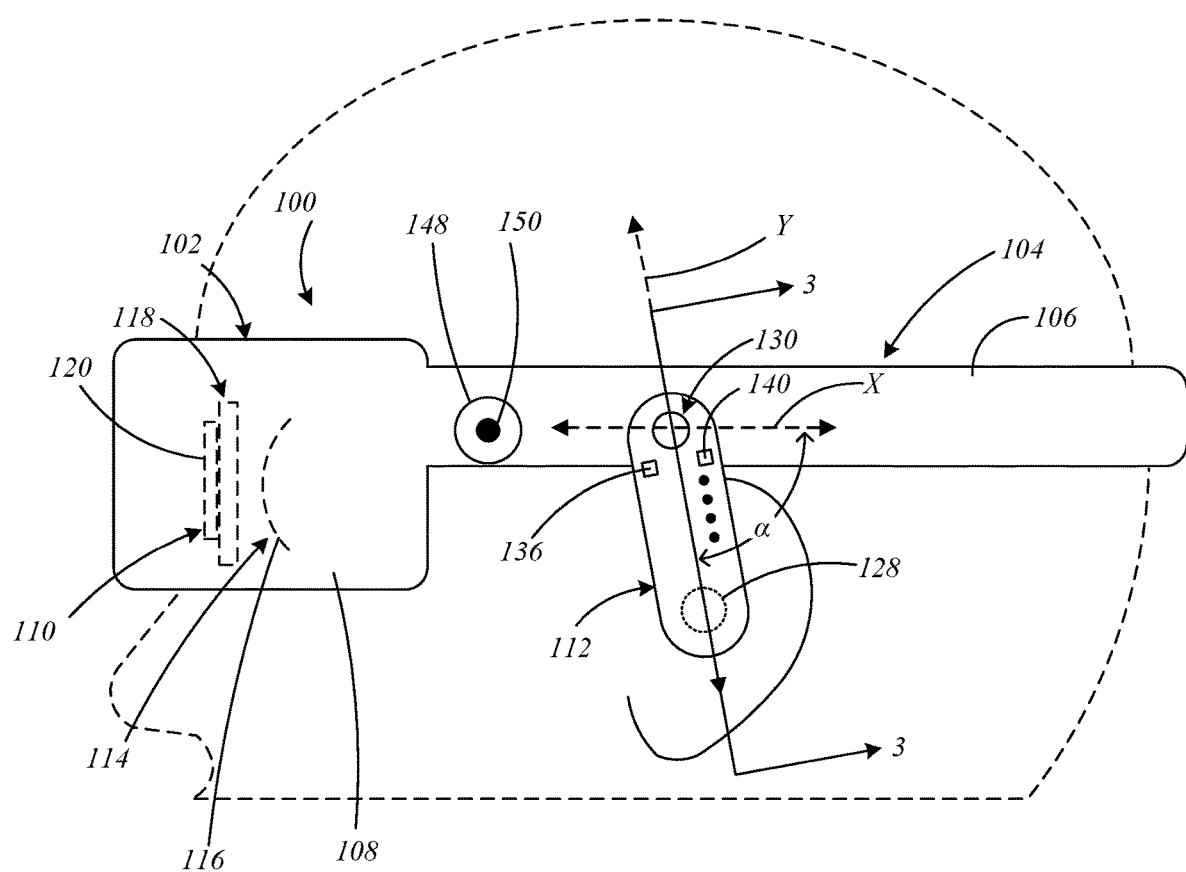
FIG. 2 is a side, plan view of the wearable display system with the audio component shown in a second position during operation in a second mode (i.e., an intra-aural mode)

FIGS. 1 and 2 generally illustrate one embodiment of a display system, which is identified by the reference character 100. The display system 100 is configured as an HMD 102 and, as such, includes one or more supports 104 that are configured to be worn by a user during use of the display system 100 (i.e., such that the display system 100 is a wearable display system). Although illustrated as including a single head strap 106 in FIG. 1, the configuration of the wearable support(s) 104 may be varied in alternate embodiments. For example, the wearable support(s) 104 may include temples (not shown) such that the HMD 102 is supported by the user's ears.

The display system 100 includes a housing 108 that accommodates the internal components of the display system 100 and may be formed using any appropriate method of manufacture and material(s). For example, the housing 108 may be formed through 3-D printing, injection molding, etc., and may include (e.g., may be formed from) materials such as plastics (ABS, PC, etc.), polymers, metallic materials, etc., either individually or in combination.

The display system 100 offers both visual capabilities (e.g., the display of images, video, etc.) and audio capabilities through the inclusion of both a visual system 110 and an audio component 112. In one embodiment, illustrated throughout the figures, the visual system 110 includes an optical element 114 (e.g., a lens 116) and a display module 118 having a display panel 120, which may be any panel suitable for the display of images, video, etc., such as, for example, a uOLED panel, an OLED panel, an LED panel, or the like. In certain embodiments, it is envisioned that the display module 118 (and/or the optical element 114) may be repositionable in relation to the housing 108 to permit adjustments in focus; the correction of field-of-view, alignment, or distortion issues; improvements in the accommodation of content; etc. Alternatively, it is envisioned that the visual system 110 itself may be devoid of the display panel 120, and instead, may include a dock, brace, or other such support (not shown) that is configured to facilitate the connection of a separate display panel 120 to the display system 100. For example, it is envisioned that the visual system 110 may be configured to removably receive a personal electronic device (e.g., a cell phone) to permit connection of the personal electronic device to the display system 100 and, thus, the display of images, video, etc. through the personal electronic device.

Figure 3:
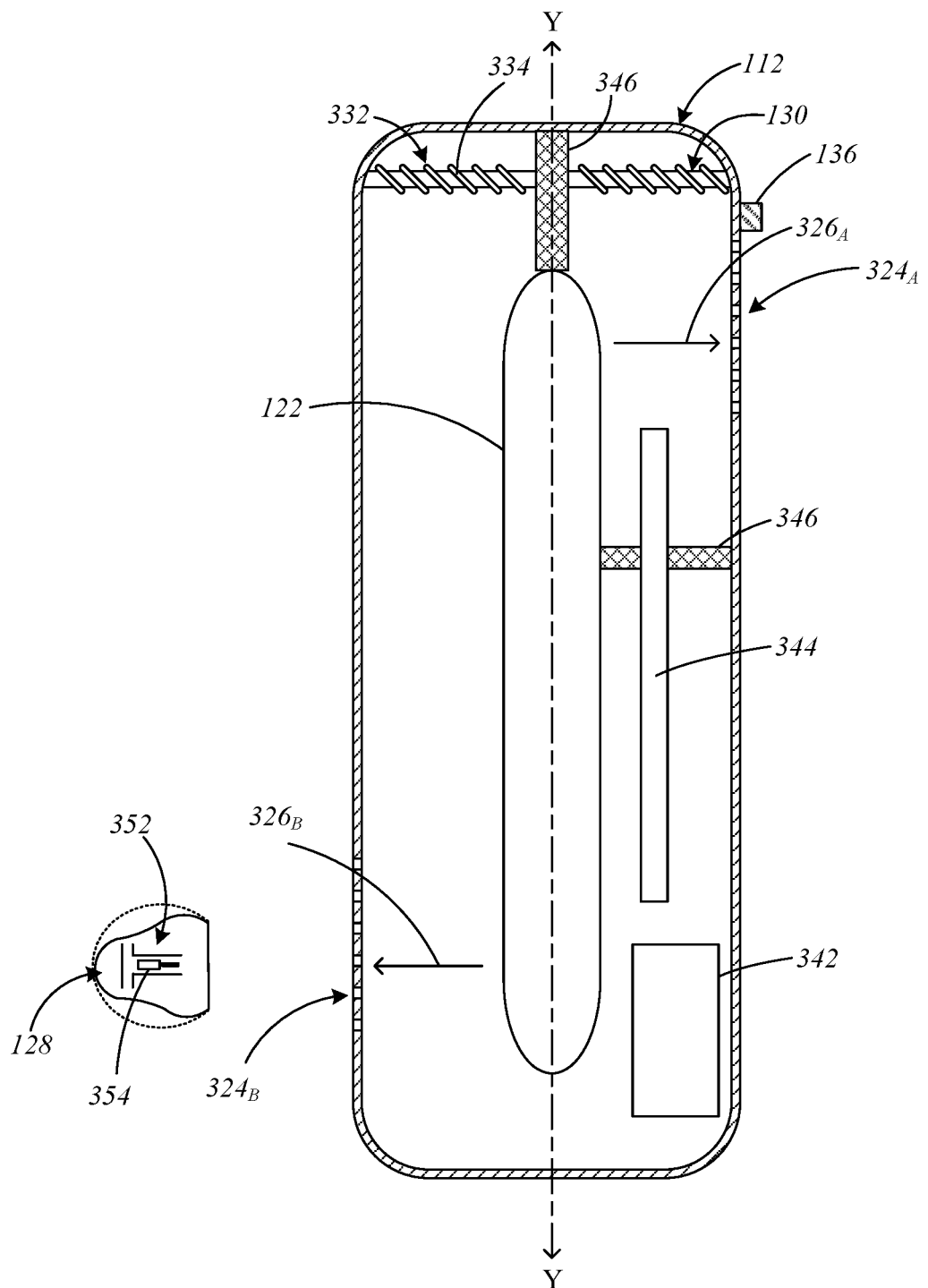
FIG. 3 is a longitudinal, cross-sectional view of the audio component taken along line 3-3 in FIG. 2.

With reference now to FIG. 3 as well, the audio component 112 will be discussed. To produce sound, the audio component 112 incorporates a driver unit 122, which may include any components suitable for this intended purpose, such as, for example, magnets, diaphragms, voice coils, single speakers, dual speakers (e.g., woofer and tweeter), etc. In various embodiments of the display system 100, it is envisioned that the scale of the driver unit 122 may be altered to achieve any desirable range of sound across a variety of frequencies. The audio component 112 covers a wide spectrum in terms of functionality and is operable in a variety of modes (discussed hereinbelow) to support different user experiences, such as, for example, virtual reality (VR), augmented reality (AR), mixed reality (MR), etc.

The driver unit 122 is in communication with (e.g., is acoustically coupled to) a series of audio ports 324 that focus sound. In the particular embodiment illustrated in FIGS. 1-3, for example, the audio component 112 includes a first (extra-aural) port $324_A$ and a second (intra-aural) port $324_B$ that is spaced from the first port $324_A$ along a longitudinal axis Y (FIG. 3) defined by the audio component 112 (i.e., an axis that extends along the length of the audio component 112) such that the ports $324_A$, $324_B$ are axially offset. The ports $324_A$, $324_B$ are oriented in generally opposite directions such that the port $324_A$ faces away from a head or temple of a user and the port $324_B$ faces towards or into an ear of the user when the display system 100 is positioned on a head of a user. Although illustrated as facing in diametrically opposite directions in this example, the particular orientation of the port $324_A$ and/or the port $324_B$ may be varied in alternate embodiments to achieve desirable emission or directivity patterns that best direct sound to an ear of the user based on a physical location of the ports $324_A$, $324_B$. For example, the ports $324_A$, $324_B$ may face directions that extend along intersecting axes or may face slightly different directions partially rotated about a longitudinal axis (e.g. longitudinal axis Y).

During operation in a first, extra-aural mode, sound is produced by the driver unit 122 and is communicated through an extra-aural path $326_A$ to the port $324_A$ which can be located slightly above and rearward of a user's ear canal, whereas during operation in a second, intra-aural mode, sound is communicated through an intra-aural path $326_B$ to the port $324_B$ and into the user's ear canal, either directly through the port $324_B$ or through an earpiece 128, which may be either fixedly or removably connected to the audio component 112 and placed at least partially within the ear canal of the user. The user can select operation in either the extra-aural mode or the intra-aural mode in a variety of ways (discussed below) based upon the desired experience. For example, during a VR experience or VR mode where the visual system 110 operates in VR, a user may select the intra-aural mode to allow for a more immersive, private audio experience in which sound can be delivered at higher volume levels with lower bass levels (as compared to the extra-aural mode), whereas during an AR or MR experience or an AR or MR mode where the visual system 110 operates in AR or MR, a user may select the extra-aural mode to allow for a more transparent audio experience in a setting where privacy is of less concern. For example, in the extra-aural mode, the user can experience sound without anything covering or obstructing an ear and/or ear canal, providing a sense of disparate spatial locations for audio sources. In the intra-aural mode, the user can sense (more so than in the extra-aural mode) that sound is being delivered artificially based on a feeling of the audio component 112 being present against an ear of the user. Being able to feel or sense the presence of the audio component 112 may reduce a sensation of sound spatialization (i.e., a perception that sound originates from one or more locations away or apart from the user) that is achieved with the audio experience of the intra-aural mode.

Depending upon the particular configuration of the driver unit 122, the ports $324_A$, $324_B$, etc., it is envisioned that sonic properties of delivered sound (e.g., bass, treble, etc.) may be varied between modes. For example, the extra-aural mode may project a higher overall volume with a boosted bass content when compared to the intra-aural mode. The intra-aural mode and the extra-aural mode can have different sound output power levels (e.g., sound levels), frequency responses (i.e., equalization levels), and directivity patterns of sound emission.

For example, the intra-aural mode can employ a lower sound output power level than the extra-aural mode. This difference accounts for differing sound emission locations, as sound emission in the intra-aural mode occurs closer to or within an ear canal of the user, and sound emission in the extra-aural mode occurs in an environment proximate to an outer surface of an ear or temple of the user where a measurable quantity of the emitted sound can dissipate into the environment. Low-frequency sound emissions are also less audible to the user in the extra-aural mode.

In another example, the intra-aural mode and the extra-aural mode can have different frequency responses or equalization levels. The extra-aural mode can employ an equalization curve that reduces and/or levels off amplitude (e.g., gain) at higher frequencies beyond a predetermined frequency cut-off, for example, to allow low frequencies to be balanced within overall sound that reaches a user. The intra-aural mode can employ an equalization curve that is flatter than the equalization curve used in the extra-aural mode in order to account for a flatter transfer function between the intra-aural driver and an eardrum of the user. Other differences in frequency response or equalization levels between the intra-aural mode and the extra-aural mode are also possible.

In another example, the wearable support 104 can include a larger speaker (e.g., a woofer, not shown) that is disposed in a separate location from the audio component 112. The larger speaker can be configured to produce sound at a predetermined power level when the audio component 112 is in the extra-aural mode and to be silent or produce sound at a lower volume or lower power level when the audio component 112 is in the intra-aural mode. The audio component 112 can include also include a smaller speaker (e.g., a tweeter, not shown) that produces sound within treble frequencies (e.g., at a first power level) when the audio component 112 is in the extra-aural mode (e.g., to complement sound produced by the woofer). The smaller speaker can also be configured to produce sound over a full range of frequencies (e.g., at a second power level) when the audio component 112 is in the intra-aural mode (e.g., to compensate for the lower volume or silent woofer). Producing sound using only the smaller, audio-component-based speaker is well suited to the more power-efficient context of intra-aural delivery. Other combinations of smaller speaker (e.g., tweeter) and larger speaker (e.g., woofer) operation within the intra-aural and extra-aural modes are also possible.

To vary operability of the audio component 112 between the extra-aural mode and the intra-aural mode, the audio component 112 is reoriented from the (first) position seen in FIG. 1 to the (second) position seen in FIG. 2. In the extra-aural mode (FIG. 1), the audio component 112 is in general alignment with the wearable support(s) 104 and in the intra-aural mode, the audio component 112 is out of general alignment with the wearable support(s) 104. More specifically, in the first position (during use in the extra-aural mode), the audio component 112 may be oriented such that the longitudinal axis Y of the audio component 112 is in generally parallel relation to a longitudinal axis X of the head strap 106, as seen in FIG. 1, whereas in the second position (during use in the intra-aural mode), the audio component 112 may be oriented such that the longitudinal axis Y of the audio component is at an angle α to the longitudinal axis X of the head strap 106. For example, it is envisioned that the angle α may lie substantially within the range of approximately 45° to approximately 135°, although values outside this range would not be beyond the scope of the present disclosure. In various embodiments, as discussed hereinbelow, it is envisioned that the audio component 112 may be either fixedly or removably connected to the wearable support(s) 104 to allow for wide variation in positioning of the audio component 112 to accommodate for differences in user size, anatomy, preference, etc.

Although the longitudinal axes X, Y are illustrated as being central longitudinal axes in the embodiment seen in FIGS. 1 and 2, in alternate embodiments, depending on the particular configuration of the audio component 112 and the wearable support(s) 104, it is envisioned that the axes X, Y may be off center. For example, in embodiments including a wearable support(s) 104 having an irregular and/or non-linear shape, the axis X may extend through the center of mass of the wearable support(s) 104, through central points at opposing ends of the wearable support(s) 104, etc.

In the embodiment seen in FIGS. 1 and 2, the audio component 112 is fixedly connected to the wearable support(s) 104 via a pivot member 130 (e.g., a screw, pin, rivet, etc.) that allows the audio component 112 to move through an arcuate range of motion. It should be appreciated, however, that in alternate embodiments of the disclosure, depending upon the particular architecture of the display system 100, the audio component 112 may be secured in an alternate location. For example, an embodiment in which the audio component 112 is secured to the housing 108 would not be beyond the scope of the present disclosure.

The pivot member 130 may be adapted and positioned to facilitate the transmission of electrical signals during use of the display system 100. For example, the pivot member 130 may include one or more electrical contacts (not shown) connectable to corresponding contacts on the wearable support(s) 104, the housing 108, etc., to establish electrical communication between the audio component 112 and the remainder of the display system 100 (e.g., the visual system 110). In such embodiments, it is envisioned that communication may be conveyed magnetically, optically, or via conduction, for example.

It is envisioned that the audio component 112 may be manually reoriented by the user. In such embodiments, the user can simply apply a force to the audio component 112 to move the audio component 112 from the position seen in FIG. 1 into the position seen in FIG. 2, thereby moving the earpiece 128 (and the port $324_B$) into general alignment with the user's ear. To bias the audio component 112 towards one position or the other, the display system 100 may include a biasing member 132 (FIG. 3). Although shown as including a spring 134 that is positioned about the pivot member 130 in the illustrated embodiment, it should be appreciated that the specific location, orientation, and configuration of the biasing member 132 can be varied in alternate embodiments of the disclosure. For example, in embodiments where the audio component 112 is biased towards the first position (FIG. 1), the user can simply apply a manual force to the audio component 112 to overcome the bias of the biasing member 132 in order to move the audio component 112 into the second position seen in FIG. 2, after which the position of the audio component 112 may be maintained via actuation of a locking member 136 (FIGS. 1-3), such as a spring-loaded detent, lever, etc., until released by the user.

In certain embodiments, it is envisioned that the display system 100 may include an actuator 438 (FIG. 4), such as a motor or other such mechanism, that is configured and positioned to move the audio component 112 between the first and second positions seen in FIGS. 1 and 2, respectively. Although shown as being integrated into the audio component 112 in the embodiment seen in FIG. 4, the particular location of the actuator 438 may be varied in alternate embodiments without departing from the scope of the present disclosure. For example, the actuator 438 may be a component of (or otherwise incorporated into) the wearable support(s) 104, the housing 108, etc. In such embodiments, the actuator 438 may be activated by the depression of a button 140 (or other such selector switch), which may be located on the audio component 112, as seen in FIGS. 1 and 2, to cause the actuator 438 to apply a force to the audio component 112 and thereby move the audio component 112 between the first and second positions.

To vary operation between the extra-aural and intra-aural modes with the position of the audio component 112, the display system 100 may include any suitable controller 342 (e.g., a processor, module, logic circuit, etc.) capable of ascertaining the particular orientation of the audio component 112. More specifically, as the audio component 112 is moved from the first position (FIG. 1) into the second position (FIG. 2) (i.e., from extra-aural operability to intra-aural operability), the controller 342 may detect such movement and redirect sound from the port $324_A$ to the port $324_B$ in the manner described herein, and as the audio component 112 is moved from the second position (FIG. 2) into the first position (FIG. 1) (i.e., from intra-aural operability to extra-aural operability), the controller 342 may detect such movement and redirect sound from the port $324_B$ to the port $324_A$ in the manner described herein.

Figure 5:
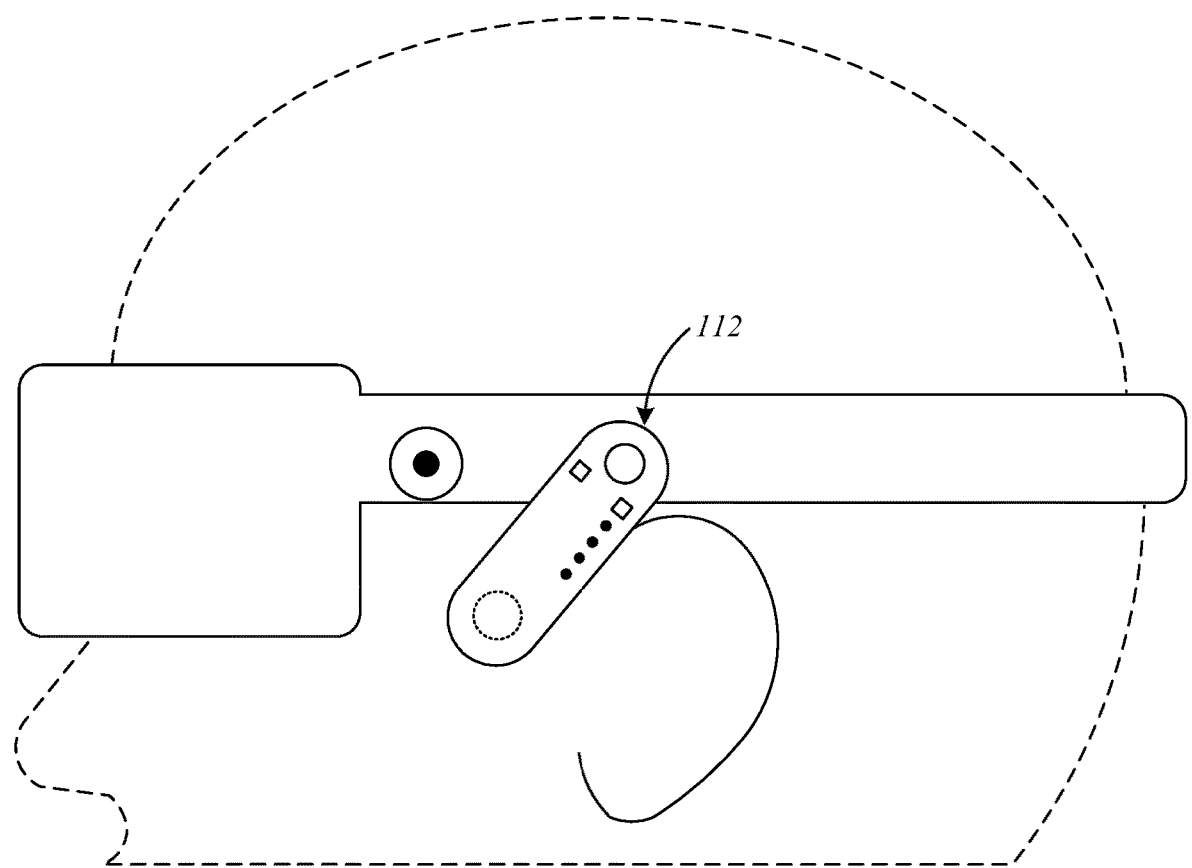
FIG. 5 is a side, plan view of the wearable display system illustrating operation of the audio component in a hybrid mode that allows for both the intra-aural and extra-aural projection of sound.

Although discussed hereinabove as being movable between two discrete positions, and as being operable in either an intra-aural mode or an extra-aural mode, in alternate embodiments of the disclosure, it is envisioned that the audio component 112 may be operable in a hybrid mode that may allow for both the intra-aural and extra-aural projection of sound. For example, the audio component 112 may be positioned as illustrated in FIG. 5, and sound may be projected through either port $324_A$ (FIGS. 3, 6), port $324_B$, or both ports $324_A$ and $324_B$.

Figure 6:
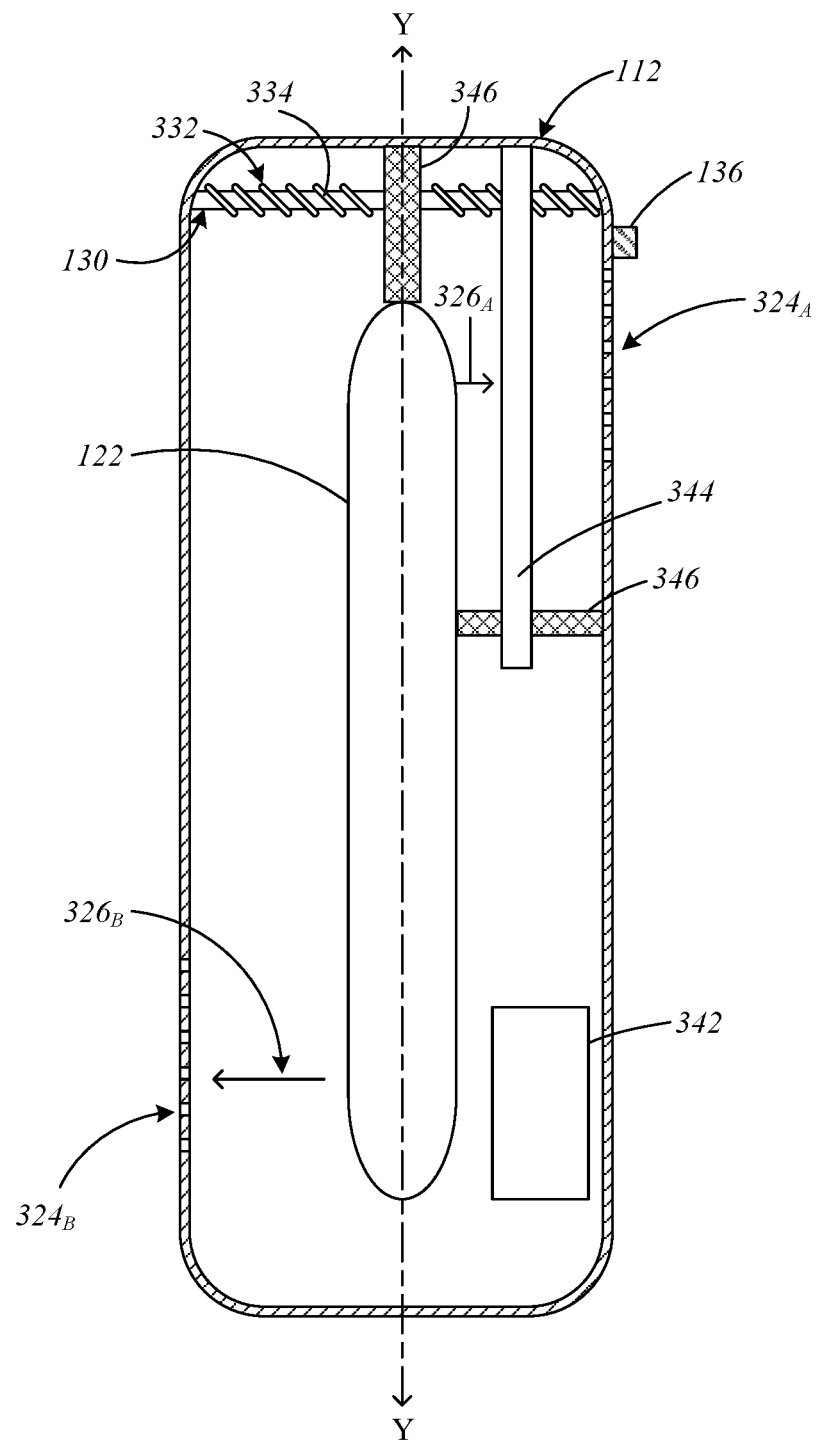
FIG. 6 is a longitudinal, cross-sectional view of one embodiment of the audio component including a biasing member to influence positioning of the audio component.

During use of the audio component 112, sound may be isolated to ensure its projection through the proper port 324. More specifically, during operation in the intra-aural mode, sound projection through the port $324_A$ (FIG. 3) may be inhibited (or entirely prevented) by obscuring/blocking the port $324_A$, and during operation in the extra-aural mode, sound projection through the port $324_B$ may be inhibited (or entirely prevented) by obscuring/blocking the port $324_B$. For example, with reference to FIGS. 3 and 6, it is envisioned that sound projection through the port $324_A$ may be regulated through the use of a repositionable gate 344 that is movable between a first position (FIG. 3) and a second position (FIG. 6). In the first position (i.e., when the audio component 112 is in the extra-aural mode), the gate 344 is positioned to allow sound to exit the port $324_A$ via the path $326_A$. However, in the second position (i.e., when the audio component 112 is in the intra-aural mode), the gate 344 is positioned to block sound transmission through the port $324_A$. To further facilitate sound transmission in the intended manner, the audio component 112 may include one or more insulators 346, as seen in FIGS. 3 and 6, to isolate and direct sound communication.

It is envisioned that the gate 344 and the audio component 112 may be moved in unison. More specifically, as the audio component 112 moves from the position seen in FIG. 1 to the position seen in FIG. 2, the gate 344 may be caused to move (e.g., slide) from the position seen in FIG. 3 to the position seen in FIG. 6, and as the audio component 112 moves from the position seen in FIG. 2 to the position seen in FIG. 1, the gate 344 may be caused to move (e.g., slide) from the position seen in FIG. 6 to the position seen in FIG. 3.

Movement of the gate 344 may be accomplished through any suitable mechanism, including, for example, a gear assembly, a rack and pinion assembly, a motor, one or more internal slidable members and bearing surfaces, etc. In an alternate embodiment, it is envisioned that movement of the audio component 112 and movement of the gate 344 may be independent. For example, the gate 344 may be manually repositionable (e.g., slidable) by the user via an external tactile member (not shown) or may be acted upon by a motor (not shown) or other such actuator.

To regulate sound projection through the port $324_B$ and the earpiece 128, with reference again to FIGS. 1 and 2, during use in the extra-aural mode, the earpiece 128 is positionable within a recess 148 that is configured to block sound projection through the earpiece 128. Although shown as being included on the wearable support(s) 104 in the illustrated embodiment, the particular location of the recess 148 may be varied in alternate embodiments depending, for example, on the particular system architecture, component dimensions, etc. Additionally, or alternatively, the display system 100 may include a plug 150 (FIGS. 1, 2) that extends outwardly from the display system 100 (e.g., from the wearable support(s) 104) for insertion into the audio component 112 (e.g., into the earpiece 128) to further assist in blocking sound projection.

The inclusion of the gate 344 (FIGS. 3, 6) and the recess 148 (and/or the plug 150) (FIGS. 1, 2) allows for both ports $324_A$, $324_B$ to be active during operation of the audio component 112 regardless of whether the audio component 112 is being used in the extra-aural mode or the intra-aural mode, thus simplifying the overall design of the audio component 112. To allow for volume modulation between modes, it is envisioned that the controller 342 (FIG. 3) may be in communication with the driver unit 122 (e.g., to vary power supplied to the driver unit 122). For example, the controller 342 may be configured to automatically increase the sound volume when the audio component 112 is in the extra-aural mode and decrease the sound volume when the audio component 112 is in the intra-aural mode. To synchronize video and audio operation, the controller 342 may also be adapted for communication with the visual system 110 (FIGS. 1, 2) to alternate operation of the visual system 110 between VR, AR, and/or MR modes, for example, based on the position of the audio component 112. More specifically, as the audio component 112 is moved from the (first) position (FIG. 1) into the (second) position (FIG. 2), the controller 342 may output a signal to vary operation of the visual system 110 from an AR or MR mode into a VR mode, and as the audio component 112 is moved from the (second) position (FIG. 2) into the (first) position (FIG. 1), the controller 342 may output a signal to vary operation of the visual system 110 from a VR mode into an AR or MR mode.

Figure 4:
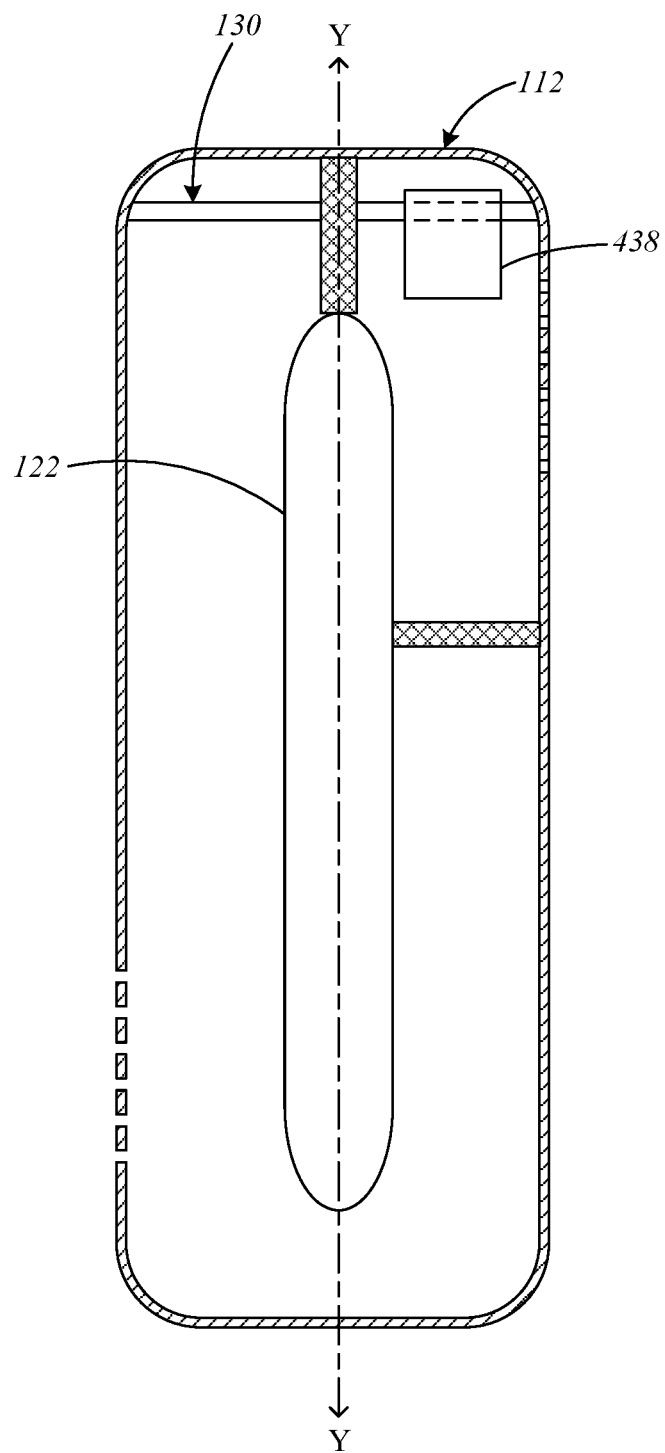
FIG. 4 is a longitudinal, cross-sectional view of an alternate embodiment of the audio component including an actuator configured to reposition the audio component between the positions seen in FIGS. 1 and 2.

With reference now to FIGS. 1-6, general operation of the display system 100 will be discussed. Following placement of the display system 100 as desired, the user elects whether to operate the display system 100 in the extra-aural mode or the intra-aural mode (e.g., based upon the desired visual experience), and the audio component 112 is oriented accordingly. For example, when a VR visual experience is desired, the user can elect operation in the intra-aural mode, and the audio component 112 can be positioned as illustrated in FIG. 2. By contrast, when an AR or MR visual experience is desired, for example, the user can elect operation in the extra-aural mode, and the audio component 112 can be positioned as illustrated in FIG. 1. To switch between the extra-aural and intra-aural modes, a force is applied to the audio component 112, either manually by the user or via the actuator 438 (FIG. 4).

When operating in the extra-aural mode, the earpiece 128 (FIGS. 1-3) may be positioned within the recess 148 (FIGS. 1, 2) to block sound projection therethrough such that sound is projected exclusively through the port $324_A$ via the path $326_A$ (FIG. 3). To transition from the extra-aural mode to the intra-aural mode, the earpiece 128 can be removed from the recess 148 to allow for the projection of sound therethrough, and the audio component 112 can be moved into the position seen in FIG. 2. During movement from the position seen in FIG. 1 to the position seen in FIG. 2, as discussed above, the gate 344 (FIGS. 3, 6) may be moved into the second position (FIG. 6) to block sound transmission through the port $324_A$ such that sound is projected through the earpiece 128 via the intra-aural path $326_B$.

To return the audio component to the extra-aural mode, the earpiece 128 can again be positioned in the recess 148 (FIGS. 1, 2), and the audio component 112 can be moved into the position seen in FIG. 1, during which adjustments the gate 344 (FIGS. 3, 6) may be moved into the second position (FIG. 3) to allow for sound transmission through the port $324_A$.

During intra-aural operation of the audio component 112, increased noise-cancelling may be desirable to create a more immersive user experience. Noise-cancelling may be facilitated, for example, by the insulators 346, which are positioned to inhibit (or entirely prevent) sound projection by isolating the port $324_A$ during use in the intra-aural mode. The noise-cancelling capabilities of the audio component 112 may also be augmented by the configuration and/or construction of the earpiece 128. More specifically, the earpiece 128 may be deformable or reconfigurable to create a more customized fit or seal with the user's ear to thereby block out ambient noise. For example, the earpiece 128 may include (e.g., may be formed from) one or more resiliently deformable materials such as foam, silicone, gel, etc. Additionally, or alternatively, it is envisioned that the earpiece 128 may be expandable and contractible. For example, as seen in FIG. 3, the audio component 112 may include an inflation system 352 that utilizes a piston 354, or other such structure, to move air (or other suitable fluid) into and out of the earpiece 128 to cause expansion and contraction as desired, as illustrated in FIG. 3.

With reference now to FIGS. 7-17, alternate embodiments of the presently disclosed audio component will be discussed. Each embodiment discussed hereinbelow is substantially similar in both structure and operation to the aforedescribed audio component 112, and, accordingly, will be discussed only with respect to any differences therefrom.

Figure 7:
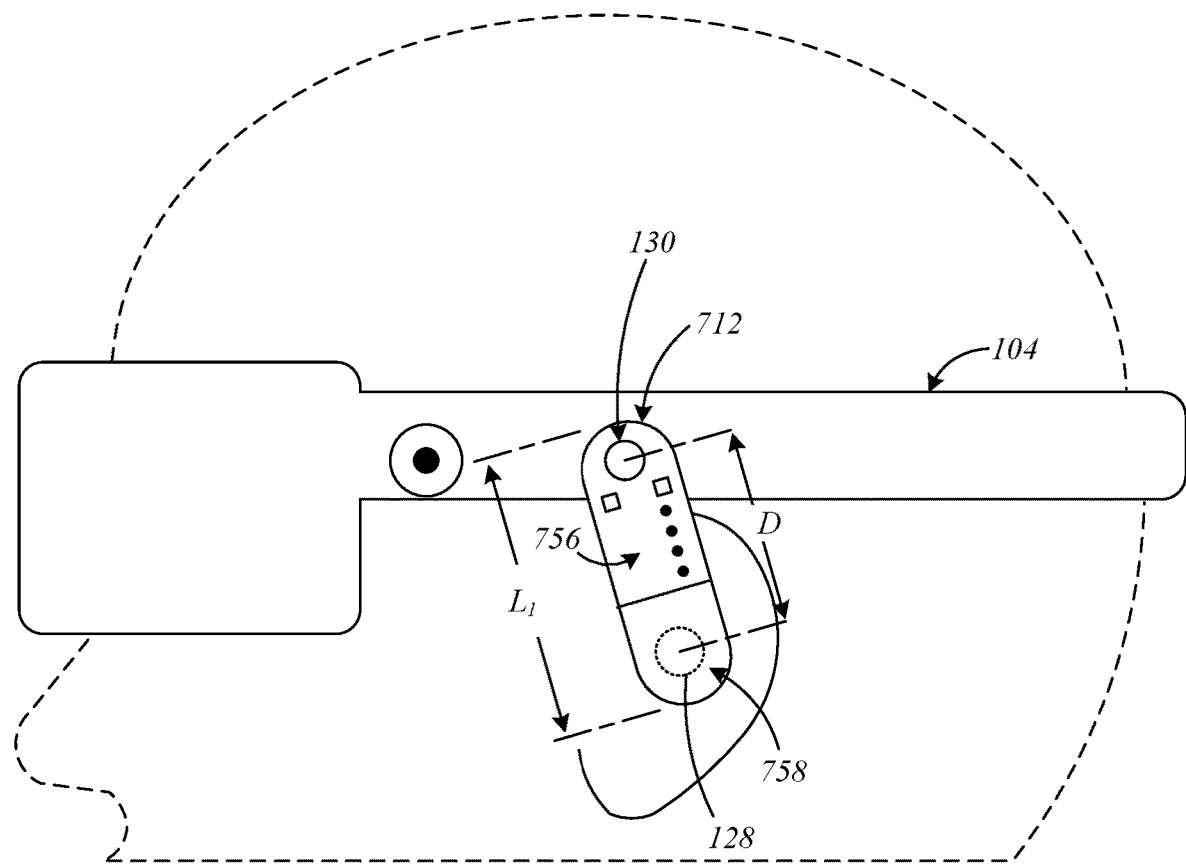
FIG. 7 is a side, plan view of the wearable display system including another embodiment of the audio component shown in a first configuration.
Figure 8:
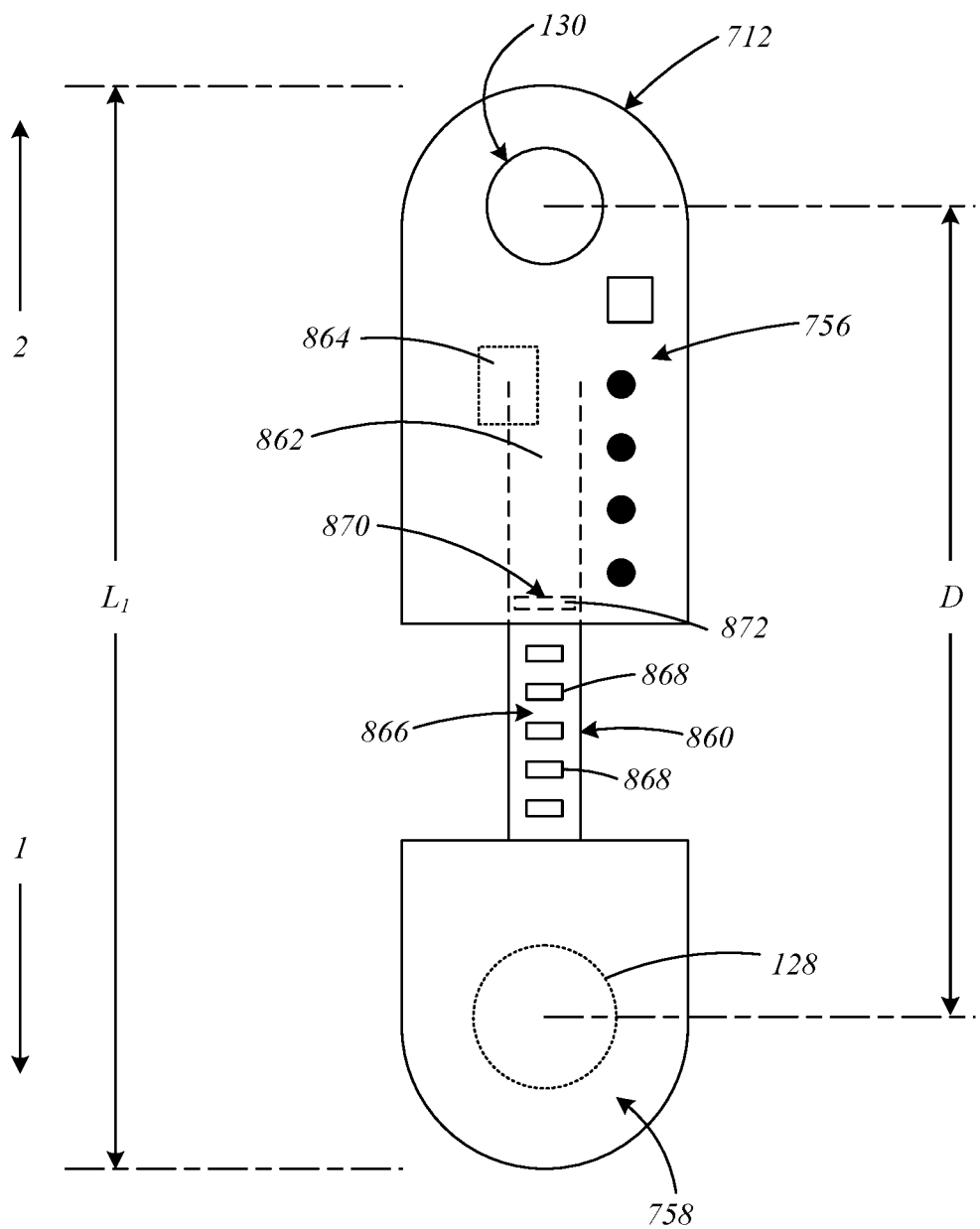
FIG. 8 is a side, plan view of the audio component shown in a second (elongated) configuration.

FIGS. 7 and 8 illustrate an embodiment of the audio component (identified by the reference character 712) that includes a first portion 756 and a second portion 758 that is movable in relation to the first portion 756. The second portion 758 includes a telescoping section 860 that extends into a channel 862 defined in the first portion 756 to allow for reconfiguration of the audio component 712 between a first configuration (FIG. 7), in which the audio component 712 defines a first overall length $L_1$, and a second (elongated) configuration (FIG. 8), in which the audio component defines a second, greater overall length $L_2$. The telescoping section 860 thus allows for variation in the overall length L of the audio component 712 and the distance D defined between the earpiece 128 and the wearable support(s) 104 (e.g., the point to which the audio component 712 is connected to the wearable support(s) 104, such as the pivot member 130) to allow for increased flexibility and precision in the orientation of the earpiece 128.

To vary the length L of the audio component 712, a force is applied to the second portion 758, either manually by the user (i.e., the user can simply pull and push on the second portion 758) or by an integrated actuator 864 (e.g., a motor or other such mechanism). More specifically, the application of a force in the direction indicated by arrow 1 (FIG. 8) causes an increase in the overall length L of the audio component 712 via withdrawal of the telescoping section 860 from the channel 862, and the application of a force in the direction indicated by arrow 2 (FIG. 8) causes a reduction in the overall length L of the audio component 712 via insertion of the telescoping section 860 into the channel 862.

It is envisioned that the overall length L of the audio component 712 may be varied in predetermined increments. For example, as seen in FIG. 8, the telescoping section 860 may include an interrupted surface 866 defining a series of detents 868, projections, ratcheting teeth, or the like that are configured for contact with a corresponding engagement member 870 on the first portion 756, such as a spring-biased lever 872. Alternatively, it is envisioned that the interrupted surface 866 may be omitted to allow for more precise variation in the overall length L of the audio component. In such embodiments, the telescoping section 860 and the channel 862 may be dimensioned in tight tolerance, or configured for engagement in an interference fit, to allow the relative positions of the respective first and second portions 756, 758 to be maintained in the absence of an external force.

Figure 9:
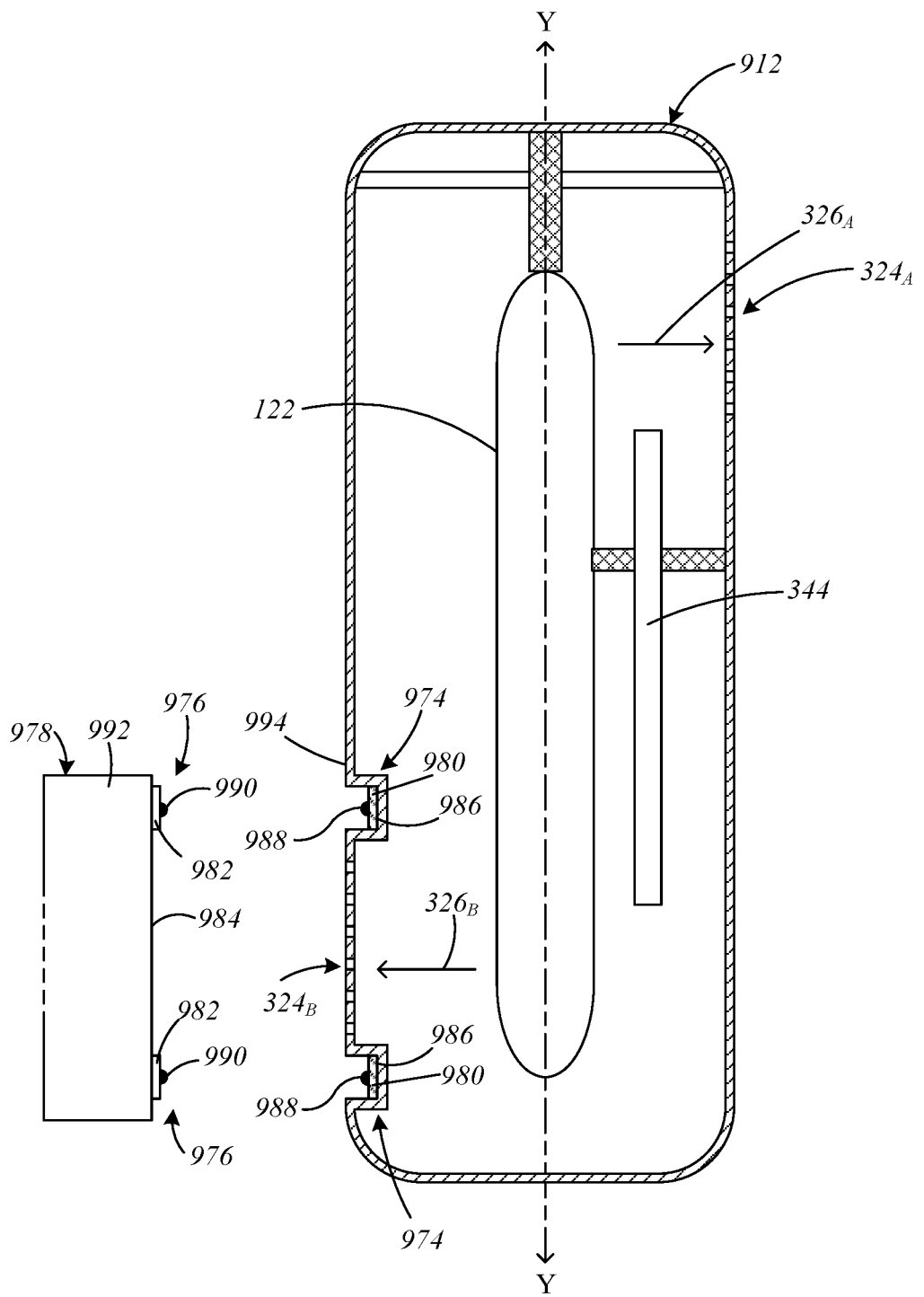
FIG. 9 is a longitudinal, cross-sectional view of another embodiment of the audio component shown with a removable accessory.

FIG. 9 illustrates another embodiment of the audio component, which is identified by the reference character 912. The audio component 912 includes one or more engagement structures 974 that are configured for releasable connection to corresponding engagement structure(s) 976 included on an accessory 978, which may be configured for either in-ear use (e.g., as an earbud) or on-ear use (e.g., as a headphone or the like). The engagement structures 974, 976 may include any member(s) or mechanism(s) suitable for the intended purpose of permitting releasable connection of the accessory 978 to the audio component 912. For example, in the particular embodiment illustrated in FIG. 9, the engagement structures 974, 976 include one or more corresponding magnets 980, 982. It is envisioned that the engagement structures 974, 976 and the magnets 980, 982 may be positioned to encourage proper alignment of the accessory 978 and the audio component 912, and relative positioning of the accessory 978 and the audio component 912 in a predetermined orientation. For example, as seen in FIG. 9, the magnets 982 may project outwardly from an outer surface 984 of the accessory 978 to facilitate receipt within corresponding recesses 986 defined by the audio component 912 and connection to the magnets 980.

Although shown as exclusively including magnets 980, 982 in the embodiment illustrated in FIG. 9, it should be appreciated that the connection between the engagement structures 974, 976 may be enhanced by (or replaced with) mechanical members, interlocks, deflectable tabs, etc., in alternate embodiments of the disclosure. It is further envisioned that the audio component 912 and the accessory 978 may include corresponding electrical contacts 988, 990 to establish electrical communication therebetween. Although shown as being associated with the engagement structures 974, 976 (e.g., the magnets 980, 982) in the embodiment seen in FIG. 9, it should be appreciated that the specific location of the electrical contacts 988, 990 may be varied in alternate embodiments of the disclosure. For example, the electrical contacts 990 may instead be positioned on a body 992 of the accessory 978, and the electrical contacts 988 may be positioned in corresponding locations on the audio component 912 (e.g., on an outer surface 994 of the audio component 912).

It is envisioned that the engagement structures 974, 976 included on the audio component 912 and the accessory 978 may be standardized to allow for interchangeability between a variety of accessories 978, such as, for example, accessories 978 that differ in style, size, etc. In such embodiments, it is envisioned that the audio component 912 may be adapted to detect the identity, configuration, etc., of the accessory 978 upon connection, such as through the communication of an electrical signal from the accessory 978 that can be processed by the controller 342 (FIG. 3) to recognize and control the audio component 912 accordingly. For example, depending upon the particular accessory 978 that is connected to the audio component 912, the audio profile, volume, bass, etc., may be automatically varied.

Figure 10:
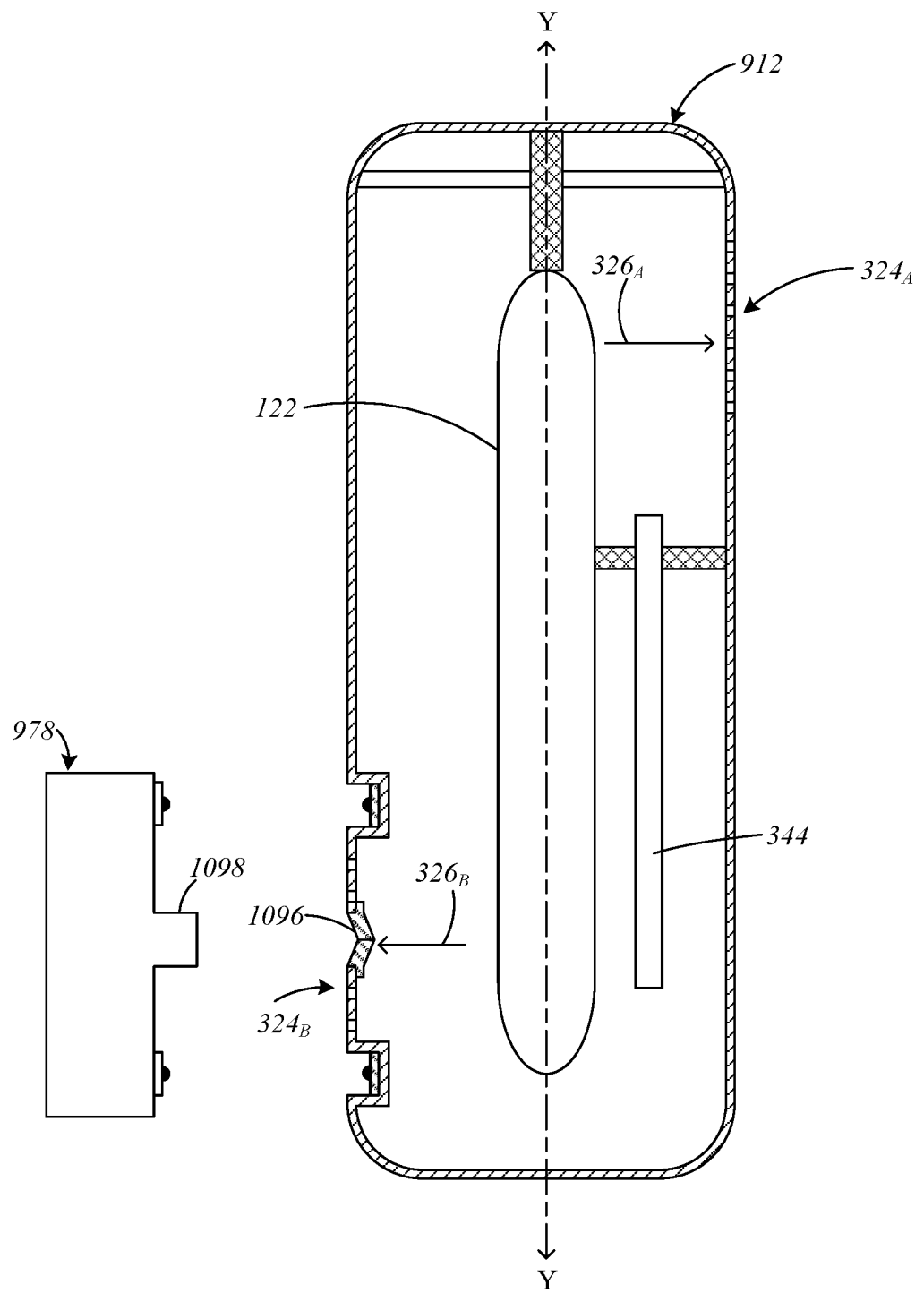
FIG. 10 is a longitudinal, cross-sectional view of another embodiment of the audio component including a seal shown with an alternate embodiment of the removable accessory prior to connection of the accessory.
Figure 11:
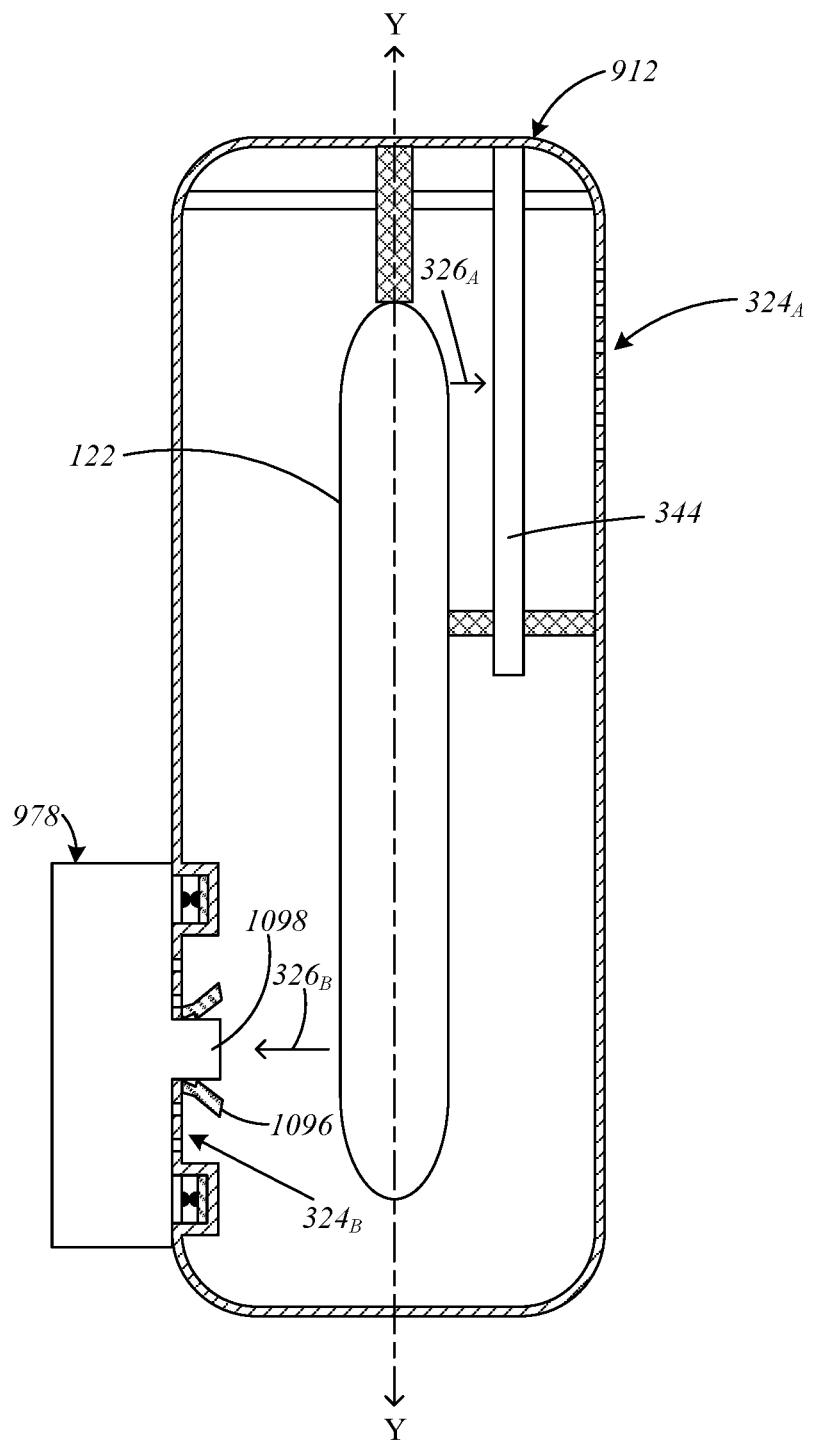
FIG. 11 is a longitudinal, cross-sectional view of the audio component and the accessory seen in FIG. 10 after connection of the accessory.

In certain embodiments, it is envisioned that the audio component 912 may include a deflectable seal 1096 (or other such member) positioned to block the projection of sound through the port $324_B$ until such time that the accessory 978 is connected, as seen in FIGS. 10 and 11. For example, the seal 1096 may be normally biased towards a closed position (FIG. 10) in the absence of the accessory 978, during which absence the audio component 912 is operable in the extra-aural mode and sound is projected along the extra-aural path $326_A$ and through the port $324_A$. Upon connection of the accessory 978, however, a fitting 1098 included on the accessory 978 is caused to engage, deform, deflect, or otherwise move the seal 1096 from the closed position seen in FIG. 10 into the open position seen in FIG. 11 to allow sound to pass through the seal 1096 and the port $324_B$ via the intra-aural path $326_B$ to enter the accessory 978 for communication to the user. In such embodiments, it is envisioned that the configuration of the recess 148 (FIGS. 1, 2) in the wearable support(s) 104 may be altered to accommodate the audio component 912 (and/or the accessory 978) in the extra-aural mode, or that the recess 148 may be omitted entirely.

Upon establishing an electrical connection between the accessory 978 and the audio component 912, such as through the electrical contacts 988, 990 (FIG. 9), a signal may be generated and processed (e.g., by the controller 342 (FIG. 3)) to automatically transition the audio component from the extra-aural mode to the intra-aural mode. More specifically, upon connection of the accessory 978, the gate 344 may be moved from the first position (FIGS. 9, 10) into the second position (FIG. 11) to close off the extra-aural path $326_A$ and block sound projection through the port $324_A$.

With reference now to FIGS. 12-17 in particular, whereas the audio component 112 discussed above with respect to FIGS. 1-6 is described as being fixedly connected to the wearable support(s) 104 (e.g., via the pivot member 130 seen in FIGS. 1, 2), each of the embodiments discussed hereinbelow is movable in relation to the wearable support(s) 104 in one or more additional degrees of freedom to add flexibility to the overall configuration of the display system 100 (FIGS. 1, 2) in the interests of accommodating a greater number of users and/or creating a more comfortable, customizable user experience. Although discussed in connection with the wearable support(s) 104 below, it should be appreciated that the point of connection with the display system 100 may be varied in alternate embodiments of the disclosure (e.g., depending upon the particular architecture employed, the intended use of the display system 100, etc.). An embodiment in which the point of connection is on the housing 108, for instance, would also be within the scope of the present disclosure.

Figure 12:
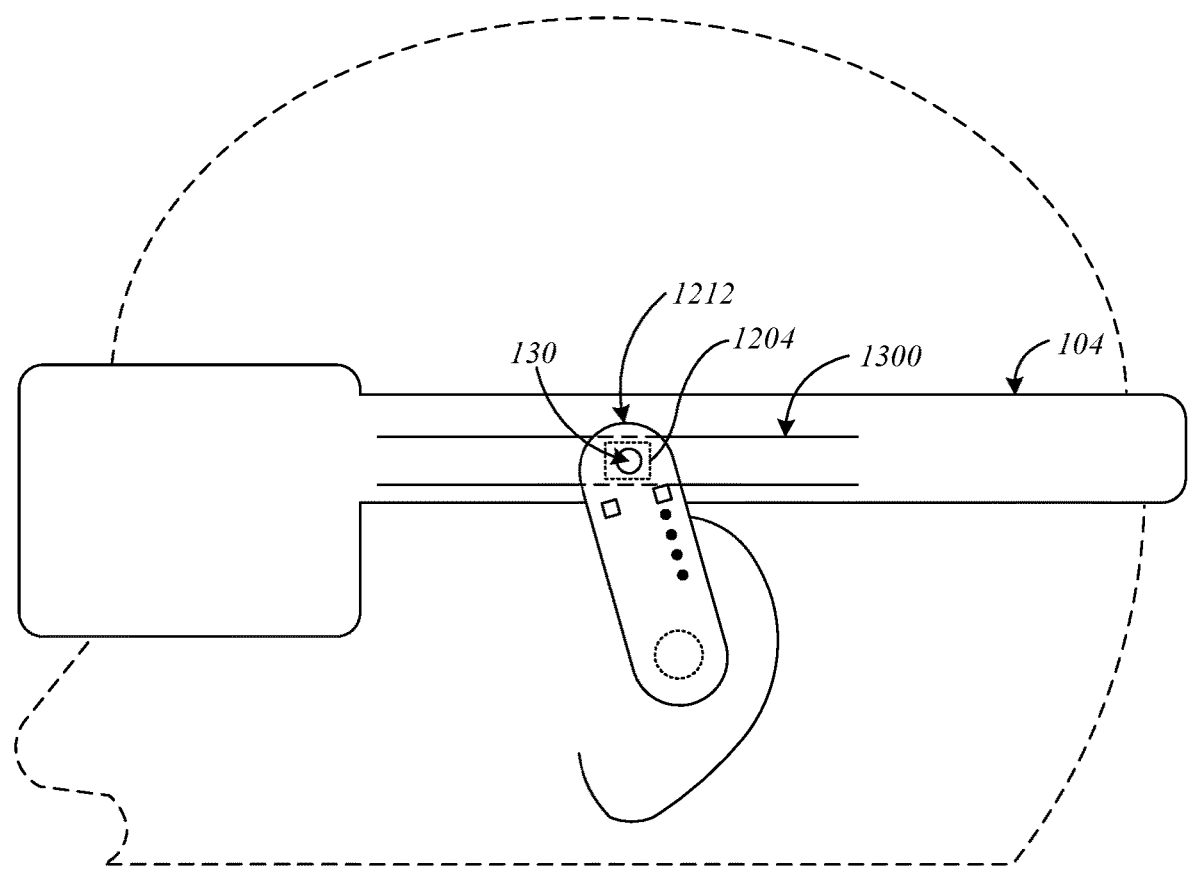
FIG. 12 is a side, plan view of the wearable display system including another embodiment of the audio component shown with an alternate embodiment of a wearable support including a linear track.
Figure 13:
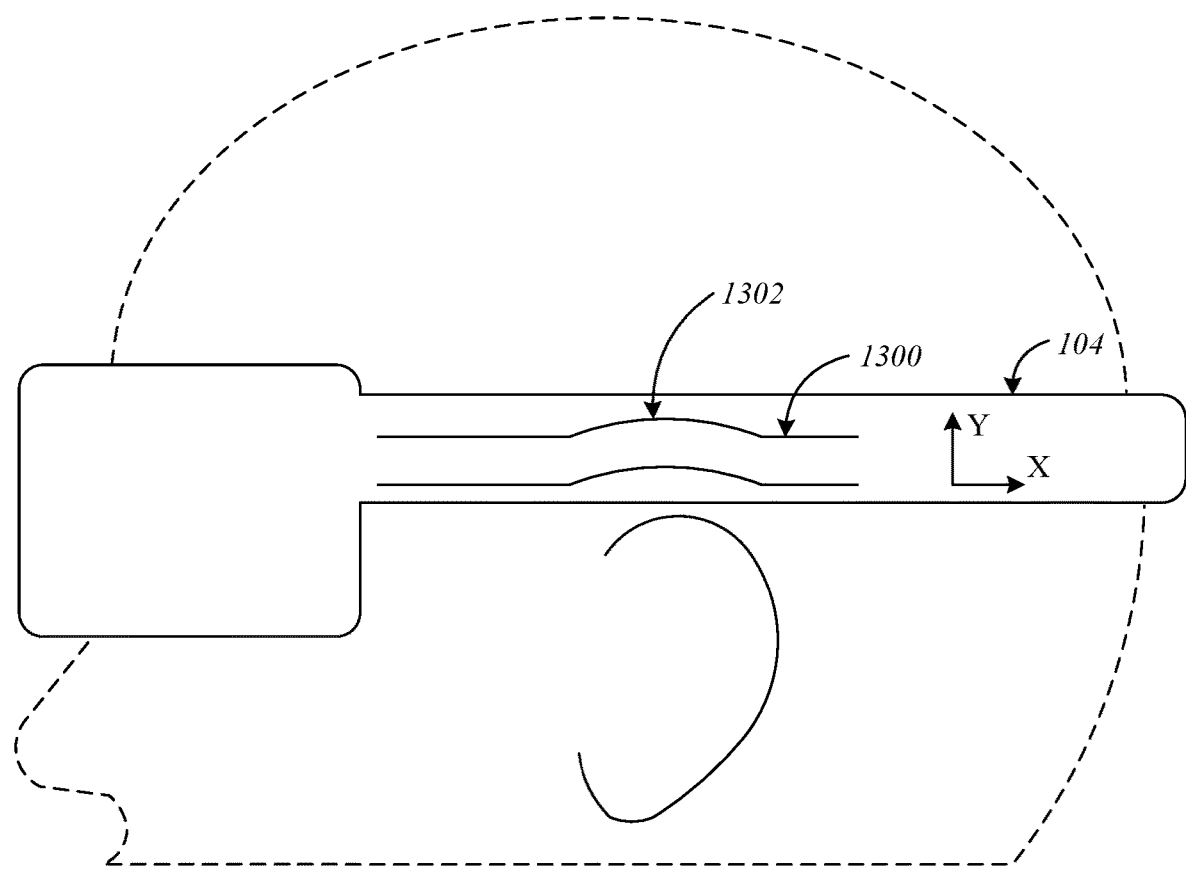
FIG. 13 is a side, plan view of the wearable display system including an alternate embodiment of the wearable support seen in FIG. 12 including a track having a curved (arcuate) portion.

FIGS. 12 and 13 illustrate an embodiment of the audio component identified by the reference character 1212. The audio component 1212 is adapted for slidable movement in relation to the wearable support(s) 104. For example, in the illustrated embodiment, the audio component 1212 is movable through a track 1300 defined by the wearable support(s) 104. Although shown as being generally linear in configuration in FIG. 12, in alternate embodiments, the track 1300 may include one or more curved (arcuate) portions 1302 to allow for movement along multiple axes X, Y, as seen in FIG. 13.

To facilitate movement along the track 1300, it is envisioned that the audio component 1212 may include any suitable structure or mechanism. For example, the audio component 1212 may include a slide 1204 (e.g., a carriage, roller, bearing, wheel, etc.). In such embodiments, it is envisioned that the slide 1204 may include (or otherwise support) the pivot member 130 to allow for both pivotable and slidable movement of the audio component 1212 in relation to the wearable support(s) 104.

Figure 14:
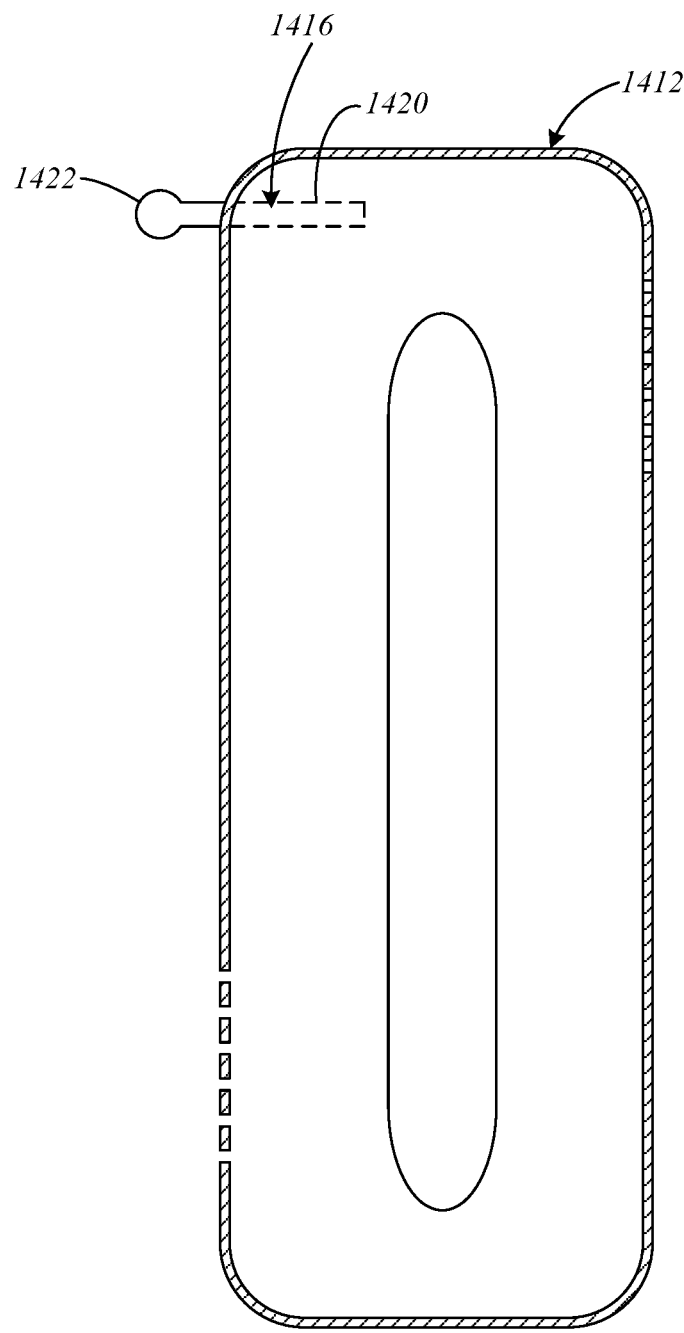
FIG. 14 is a longitudinal, cross-sectional view of another embodiment of the audio component including an anchor.
Figure 15:
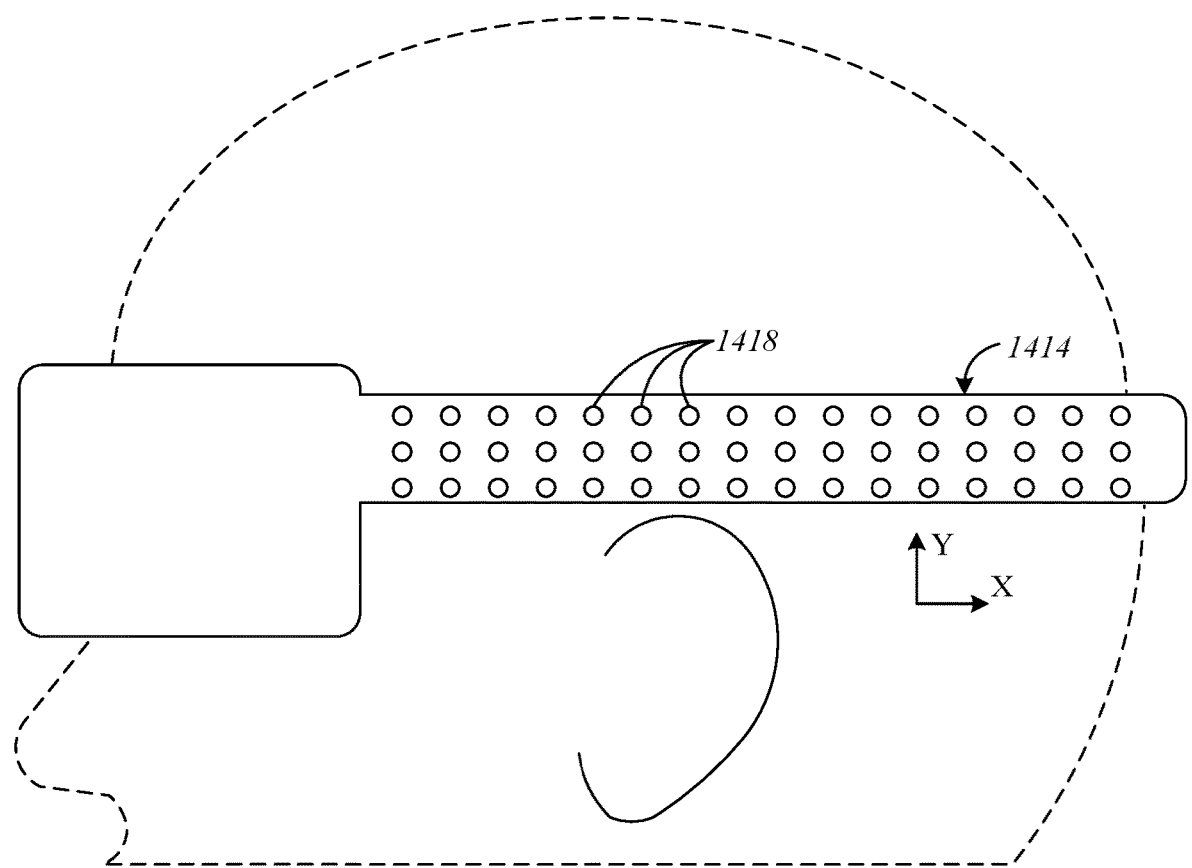
FIG. 15 is a side, plan view of an alternate embodiment of the wearable support for use with the audio component seen in FIG. 14.

With reference now to FIGS. 14 and 15, an additional embodiment of the audio component, which is identified by the reference character 1412, will be discussed in connection with an alternate embodiment of the wearable support(s), which is identified by the reference character 1414. The audio component 1412 includes an anchor 1416 that is configured for insertion into, and removal from, one or more corresponding openings 1418 in the wearable support(s) 1414. For example, in the illustrated embodiment, the anchor 1416 includes a post 1420 defining a bulbous end 1422 that is configured for positioning within the opening(s) 1418 (e.g., in an interference fit) to allow the audio component 1412 to be secured to and removed from the wearable support(s) 1414. The anchor 1416 and the opening(s) 1418 may be configured to allow the audio component 1412 to be pivoted in relation to the wearable support(s) 1414 about an axis defined by the anchor 1416 to allow for more precise adjustment in the specific location of the audio component 1412 (i.e., to allow for variation in the angle α (FIG. 2)). The anchor 1416 and the opening(s) 1418 thus permit movement of the audio component 1412 in multiple degrees of freedom (i.e., lateral and longitudinal movement along the axes X, Y, as well as pivotable movement).

In various embodiments of the disclosure, it is envisioned that the opening(s) 1418 may extend either partially through the wearable support(s) 1414, or entirely through the wearable support(s) 1414. By extending the opening(s) 1418 entirely through the wearable support(s) 1414, air flow and circulation may be increased, thereby facilitating a more comfortable user experience. It is further envisioned that, in certain embodiments, the anchor 1416 and the opening(s) 1418 may include one or more magnetic materials as well as one or more electrical contacts (not shown) to establish electrical communication between the audio component 1412 and the remainder of the display system 100 (FIGS. 1, 2).

During use of the audio component 1412 and the wearable support(s) 1414, to remove and relocate the audio component 1412, the anchor 1416 can be simply withdrawn from one opening 1418 and inserted into another. Through the inclusion of a series of openings 1418 positioned at different locations on the wearable support(s) 1414, the wearable support(s) 1414 and the audio component 1412 allow for increased flexibility in the location and orientation of the audio component 1412.

Figure 16:
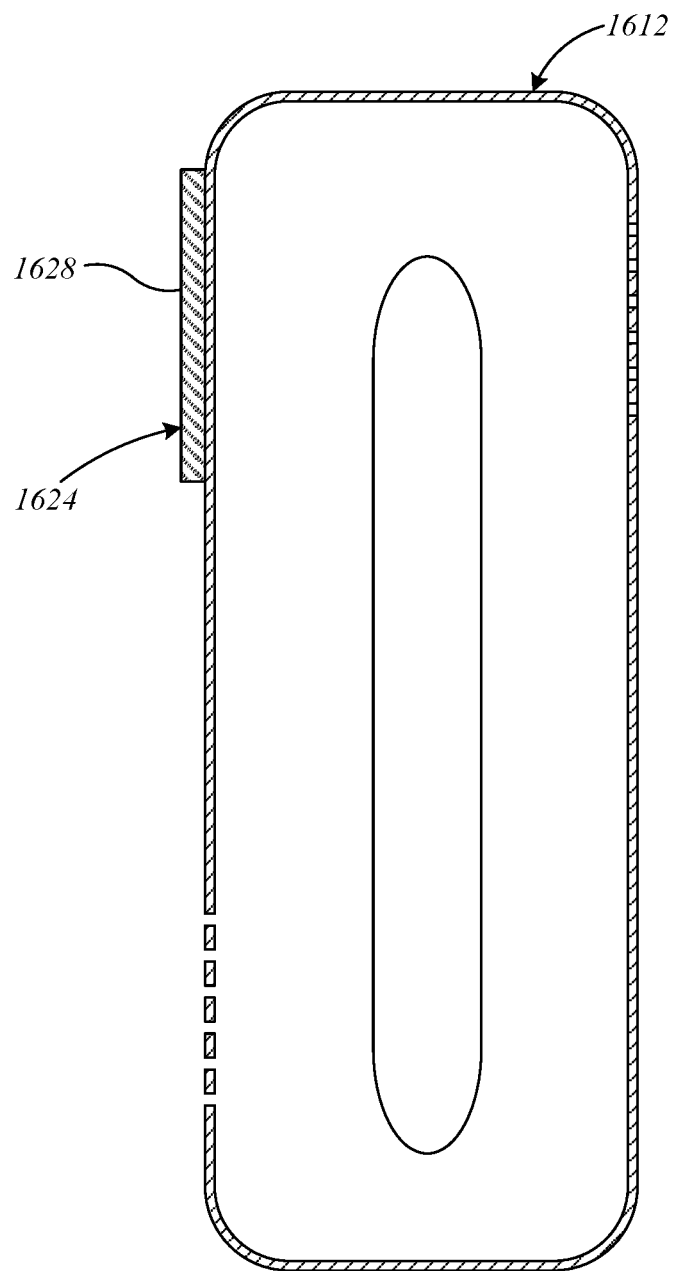
FIG. 16 is a longitudinal, cross-sectional view of another embodiment of the audio component including a magnetic attachment member.
Figure 17:
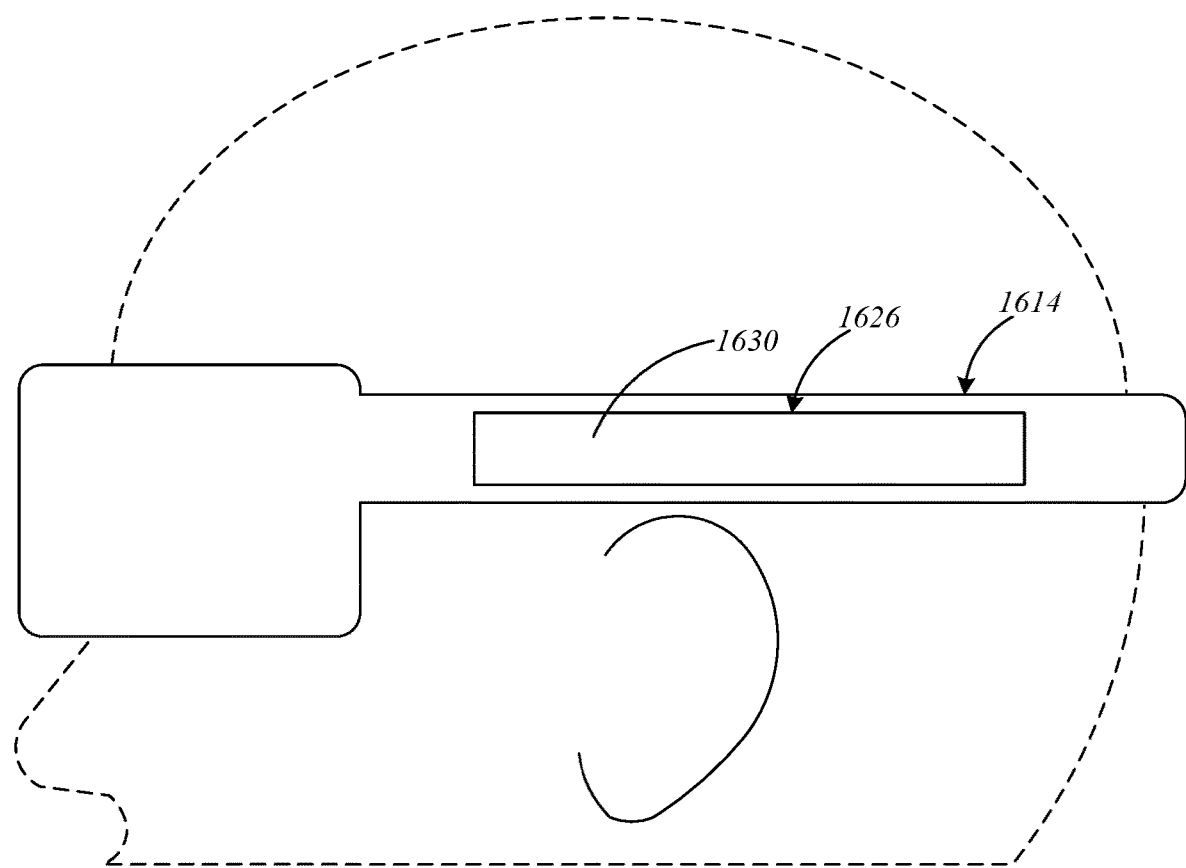
FIGS. 17 and 18 are side, plan views of alternate embodiments of the wearable support for use with the audio component seen in FIG. 16.
Figure 18:
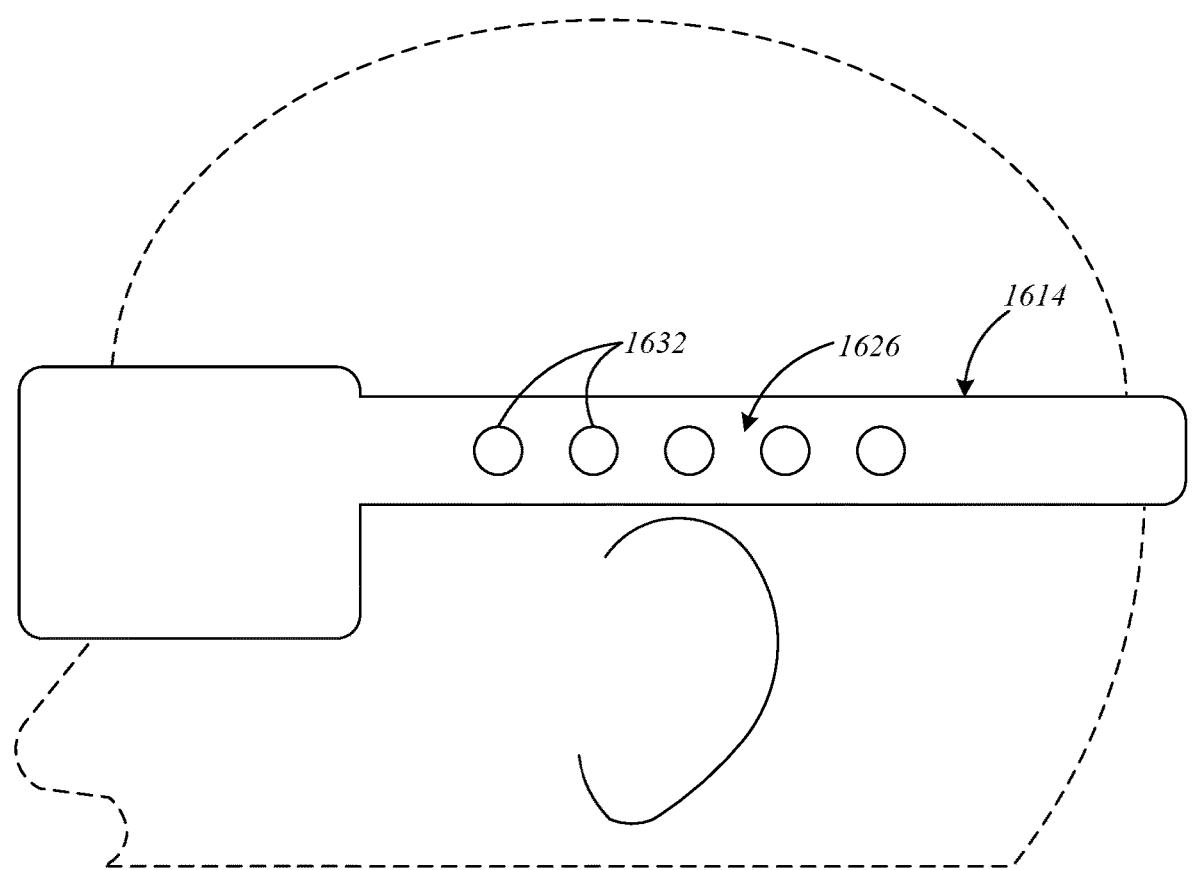

FIGS. 16-18 illustrate additional embodiments of the audio component and the wearable support(s), which are respectively identified by the reference characters 1612 and 1614. To facilitate the connection, disconnection, and reorientation of the audio component 1612, the audio component 1612 includes a magnetic attachment member 1624 that is configured for engagement with one or more corresponding attachment members 1626 included on the wearable support(s) 1614. The attachment members 1624, 1626 may assume any configuration suitable for the intended purpose of facilitating the connection and disconnection of the audio component 1612. In the embodiment illustrated in FIGS. 16 and 17, for example, the attachment member 1624 included on the audio component 1612 is configured as a disc 1628, and the attachment member 1626 included on the wearable support(s) 1614 is configured as an elongate plate 1630. Such configurations allow for not only variability in the placement of the audio component 1612, but for relative movement between the audio component 1612 and the wearable support(s) 1614 after placement (e.g., by sliding the audio component 1612 along the plate 1630 to permit movement in relation to the wearable support(s) 1614 in a manner that preserves magnetic contact). It should be appreciated, however, that the configuration of the attachment members 1624, 1626 may be varied in alternate embodiments without departing from the scope of the present disclosure. For example, the attachment member 1626 included on the wearable support(s) 1614 may instead include a series of discs 1632 corresponding in configuration to the disc 1628 included on the audio component 1612 to allow for placement in one or more predetermined locations, as seen in FIG. 18.

As discussed above with respect to the embodiment seen in FIGS. 14 and 15, it is envisioned that the attachment members 1624, 1626 may be configured to allow for movement of the audio component 1612 in multiple degrees of freedom. For example, after connection of the attachment members 1624, 1626, it is envisioned that the attachment members 1624, 1626 may allow for slidable movement of the audio component 1612 and/or rotatable (i.e., pivotable) movement of the audio component 1612 in relation to the wearable support(s) 1614.

To obscure the connection between any of the aforedescribed embodiments of the presently disclosed audio component and wearable support(s), it is envisioned that the display system 100 (FIGS. 1, 2) may include a wrap, cover, etc. (not shown), which may be either fixedly connected to (e.g., integrally formed with) the wearable support(s), or removable therefrom. In such embodiments, the wrap, cover, etc., may be formed from any suitable material or combination of materials, including, for example, foam, fabric, polymeric materials, etc.

Persons skilled in the art will understand that the various embodiments of the disclosure described herein and shown in the accompanying figures constitute non-limiting examples. Additionally, persons skilled in the art will understand that the elements and features shown or described in connection with one embodiment may be combined with those of another embodiment without departing from the scope of the present disclosure. For example, the telescoping section 860 discussed in connection with FIG. 8, the pivot member 130 discussed in connection with FIGS. 1-3, etc., may be incorporated into any of the embodiments of the audio component discussed herein.

In the preceding description, reference may be made to the spatial relationship between the various structures illustrated in the accompanying drawings and to the spatial orientations of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," etc., should be understood to describe a relative relationship between the structures and/or a spatial orientation of the structures.

The use of terms such as "approximately" and "generally" should be understood to allow for variations in any numerical range or concept with which they are associated. For example, it is envisioned that the use of terms such as "approximately" and "generally" should be understood to encompass variations on the order of 25%, or to allow for manufacturing tolerances and/or deviations in design.

As described above, one aspect of the present technology is the gathering and use of data available from various sources, such as from the display system 100, the audio component 112, or user profiles, to improve the delivery to users of content associated with the display system 100 and the audio component 112. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Further, other uses for personal information data that benefit the user are also contemplated by the present disclosure. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users.

Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of user-profile-based delivery of content, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be provided to users by inferring preferences based on non-personal information data or a bare minimum amount of personal information, such as the content being requested by the device associated with a user, other non-personal information available to the device, or publicly available information.

What is claimed is:

1. A head-mounted display system, comprising:
a housing;
a visual system associated with the housing to facilitate image and/or video display;
a wearable support connectable to the housing;
an audio component pivotably connected to the support such that the audio component is movable between a first position, in which the audio component is in general alignment with the support, and a second position, in which the audio component is out of general alignment with the support,
wherein movement from the first position to the second position transitions the audio component from a first mode, in which sound is projected through a first port in communication with a driver to a user, to a second mode, in which sound is projected through a second port in communication with the driver to the user, and
wherein movement from the second position to the first position transitions the audio component from the second mode to the first mode; and
an earpiece positioned on the audio component to receive sound through the second port, the earpiece being configured for sealing engagement with a user's ear to reduce external noise in the second mode.

2. The display system of claim 1, further including a controller in communication with the audio component to regulate sound projection in the first and second positions.

3. The display system of claim 1, wherein the first and second ports face in first and second directions, which are generally opposite directions.

4. The display system of claim 1, wherein the audio component is reconfigurable between a first configuration in which the audio component defines a first overall length and a second configuration in which the audio component defines a second overall length greater than the first overall length.

5. The display system of claim 1, wherein the support defines a receipt structure configured to receive the earpiece in the first position to inhibit sound projection from the second port.

6. The display system of claim 1, wherein the support includes a woofer that is separate from the audio component, wherein the woofer produces sound at a first power level in one of the first and second modes and at a second power level in the other of the first and second modes, and wherein the first power level is not equal to the second power level.

7. A wearable display system, comprising:
a support;
an audio component movable in relation to the support between a first position, in which the audio component projects sound through a first port in a first mode and is in general alignment with the support, and a second position, in which the audio component projects sound through a second port in a second mode and is out of general alignment with the support; and
an earpiece configured for sealing engagement with a user's ear to reduce external noise in the second mode, wherein in the first mode, the audio component projects sound in at least one of a first power level or frequency response, and
wherein in the second mode, the audio component projects sound in at least one of a second power level or frequency response.

8. The display system of claim 7, wherein the support and the audio component are each configured to allow for relocation of the audio component on the support, the audio component being slidably and/or magnetically connectable to the support such that the audio component is pivotable in relation to the support, the audio component extending in generally parallel relation to the support in the first position and extending at an angle to the support in the second position, wherein the first and second ports are axially offset from one another along a longitudinal axis of the audio component.

9. The display system of claim 7, wherein the first port projects sound in a direction away from a user's temple or a user's head, wherein the second port projects sound in a direction toward or into the user's ear, and wherein the first and second ports are axially offset from one another along a longitudinal axis of the audio component.

10. The display system of claim 7, wherein the audio component slidably engages the support.

11. The display system of claim 7, wherein the audio component is removably connectable to the support.

12. The display system of claim 11, wherein the support and the audio component are magnetically connectable.

13. The display system of claim 7, wherein the audio component is fixedly connected to the support.

14. The display system of claim 7, wherein the audio component is pivotably connected to the support at a pivot point such that the audio component extends in generally parallel relation to the support in the first position and extends at an angle within a range of 45 degrees to 125 degrees in respect to the support in the second position.

15. The display system of claim 7, wherein the audio component includes a telescoping section, the telescoping section being configured to allow for variation in a distance defined between the support and the earpiece.

16. The display system of claim 7, wherein the support includes a woofer that is separate from the audio component, wherein the woofer produces sound at a first woofer power level in one of the first and second modes and at a second woofer power level in the other of the first and second modes, and wherein the first woofer power level is not equal to the second woofer power level.

17. The display system of claim 7, wherein the support defines a receipt structure configured to receive the earpiece in the first position to inhibit sound projection from the second port.

18. A method of controlling audio operability in a wearable display system including an internal display panel configured to display images and/or video, the method comprising:
moving an audio component in relation to a wearable support of the display system to transition the audio component between an extra-aural mode in which sound is projected through a first port and an intra-aural mode in which sound is projected through a second port,
wherein moving the audio component in relation to the support includes pivoting the audio component to move the audio component between a first position, in which the audio component is in general alignment with the wearable support and the audio component operates in the extra-aural mode, and a second position, in which the audio component is out of general alignment with the wearable support and the audio component operates in the intra-aural mode.

19. The method of claim 18, wherein sound is projected through the first port facing in a first direction in the extra-aural mode and through the second port and an earpiece of the audio component facing in a second direction opposite the first direction in the intra-aural mode.

20. The method of claim 18, wherein moving the audio component between the first and second positions includes varying sound projection through the first and second ports of the audio component.

21. The method of claim 18, wherein moving the audio component between the first and second positions causes a visual system of the wearable display system to transition between a virtual reality (VR) mode to an augmented reality (AR) mode or a mixed reality (MR) mode.

22. The method of claim 18, wherein the first port and the second port are axially offset from one another along a longitudinal axis of the audio component.

23. The method of claim 18, wherein the support is configured to extend from a visual system, along a user's temple, to a user's ear to secure the wearable display system to a user's head.

* * * * *